(12) United States Patent
Hawkins et al.

(10) Patent No.: US 9,530,091 B2
(45) Date of Patent: *Dec. 27, 2016

(54) METHODS, ARCHITECTURE, AND APPARATUS FOR IMPLEMENTING MACHINE INTELLIGENCE AND HIERARCHICAL MEMORY SYSTEMS

(75) Inventors: Jeffrey Hawkins, Atherton, CA (US); Dileep George, Menlo Park, CA (US)

(73) Assignee: Numenta, Inc., Redwood City, CA (US)

( * ) Notice: Subject to any disclaimer, the term of this patent is extended or adjusted under 35 U.S.C. 154(b) by 1167 days.

This patent is subject to a terminal disclaimer.

(21) Appl. No.: 13/438,670

(22) Filed: Apr. 3, 2012

(65) Prior Publication Data

US 2012/0197823 A1    Aug. 2, 2012

Related U.S. Application Data

(60) Continuation of application No. 12/040,849, filed on Feb. 29, 2008, now Pat. No. 8,175,981, which is a
(Continued)

(51) Int. Cl.
*G06N 7/00*    (2006.01)
*G06N 3/02*    (2006.01)

(52) U.S. Cl.
CPC ............... *G06N 3/02* (2013.01); *G06N 7/005* (2013.01)

(58) Field of Classification Search
CPC ..................................................... G06N 7/005
(Continued)

(56) References Cited

U.S. PATENT DOCUMENTS 4,766,534 A    8/1988  DeBenedictis
4,845,744 A    7/1989  DeBenedictis
(Continued)

FOREIGN PATENT DOCUMENTS

EP          1 557 990           7/2005
WO     WO 2006/063291         6/2006
(Continued)

OTHER PUBLICATIONS

Lee et al ("Hierarchical Bayesian inference in the visual cortex" Jul. 2003).*
(Continued)

*Primary Examiner* — Lut Wong
(74) *Attorney, Agent, or Firm* — Fenwick & West LLP

(57) ABSTRACT

Sophisticated memory systems and intelligent machines may be constructed by creating an active memory system with a hierarchical architecture. Specifically, a system may comprise a plurality of individual cortical processing units arranged into a hierarchical structure. Each individual cortical processing unit receives a sequence of patterns as input. Each cortical processing unit processes the received input sequence of patterns using a memory containing previously encountered sequences with structure and outputs another pattern. As several input sequences are processed by a cortical processing unit, it will therefore generate a sequence of patterns on its output. The sequence of patterns on its output may be passed as an input to one or more cortical processing units in next higher layer of the hierarchy. A lowest layer of cortical processing units may receive sensory input from the outside world. The sensory input also comprises a sequence of patterns.

18 Claims, 16 Drawing Sheets

Related U.S. Application Data division of application No. 11/010,243, filed on Dec. 10, 2004, now abandoned.

(58) Field of Classification Search
USPC .......................................................... 706/12
See application file for complete search history.

(56) References Cited

U.S. PATENT DOCUMENTS

| | | | |
|---|---|---|---|
| 5,255,348 A | 10/1993 | Nenov | |
| 5,712,953 A | 1/1998 | Langs | |
| 5,729,661 A | 3/1998 | Keeler et al. | |
| 5,761,389 A | 6/1998 | Maeda et al. | |
| 6,028,608 A | 2/2000 | Jenkins | |
| 6,122,014 A | 9/2000 | Panusopone et al. | |
| 6,144,711 A | 11/2000 | Raleigh et al. | |
| 6,195,622 B1 | 2/2001 | Altschuler et al. | |
| 6,353,814 B1 | 3/2002 | Weng | |
| 6,366,896 B1 | 4/2002 | Hutchison | |
| 6,400,996 B1 | 6/2002 | Hoffberg et al. | |
| 6,468,069 B2 | 10/2002 | Lemelson et al. | |
| 6,567,814 B1 | 5/2003 | Bankier et al. | |
| 6,615,211 B2 | 9/2003 | Beygelzimer et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,882,992 B1 | 4/2005 | Werbos | |
| 6,957,241 B2 | 10/2005 | George | |
| 7,088,693 B2 | 8/2006 | George | |
| 7,251,637 B1 | 7/2007 | Caid et al. | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,676,458 B2 | 3/2010 | Aggarwal et al. | |
| 7,739,208 B2 | 6/2010 | George et al. | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 | 3/2011 | George et al. | |
| 7,904,412 B2 | 3/2011 | Saphir et al. | |
| 7,937,342 B2 | 5/2011 | George et al. | |
| 7,941,389 B2 | 5/2011 | Marianetti, II et al. | |
| 7,941,392 B2 | 5/2011 | Saphir | |
| 7,983,998 B2 | 7/2011 | George et al. | |
| 8,037,010 B2 | 10/2011 | Jaros et al. | |
| 8,102,423 B2 | 1/2012 | Cheng | |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 8,732,098 B2 | 5/2014 | Ahmad et al. | |
| 2002/0002688 A1 | 1/2002 | Gregg et al. | |
| 2002/0038294 A1 | 3/2002 | Matsugu | |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0105597 A1 | 6/2003 | Tsui et al. | |
| 2003/0123732 A1 | 7/2003 | Miyazaki et al. | |
| 2003/0149676 A1 | 8/2003 | Kasabov | |
| 2003/0167111 A1 | 9/2003 | Kipersztok et al. | |
| 2004/0002838 A1 | 1/2004 | Oliver et al. | |
| 2004/0015459 A1 | 1/2004 | Jaeger | |
| 2004/0142325 A1 | 7/2004 | Mintz et al. | |
| 2004/0148520 A1 | 7/2004 | Talpade et al. | |
| 2004/0267395 A1 | 12/2004 | Discenzo et al. | |
| 2005/0002572 A1 | 1/2005 | Saptharishi et al. | |
| 2005/0028033 A1 | 2/2005 | Kipersztok et al. | |
| 2005/0063565 A1 | 3/2005 | Nagaoka et al. | |
| 2005/0190990 A1 | 9/2005 | Burt et al. | |
| 2005/0203773 A1 | 9/2005 | Soto et al. | |
| 2005/0222811 A1 | 10/2005 | Jakobson et al. | |
| 2006/0093188 A1 | 5/2006 | Blake et al. | |
| 2006/0098886 A1 | 5/2006 | De Haan | |
| 2006/0155660 A1 | 7/2006 | Koshizen et al. | |
| 2006/0161736 A1 | 7/2006 | Huang | |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0019754 A1 | 1/2007 | Raleigh et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 | 11/2007 | Burke | |
| 2007/0276774 A1 | 11/2007 | Ahmad et al. | |
| 2008/0059389 A1 | 3/2008 | Jaros et al. | |
| 2008/0140593 A1 | 6/2008 | George et al. | |
| 2008/0183647 A1 | 7/2008 | Hawkins et al. | |
| 2008/0201286 A1 | 8/2008 | Hawkins et al. | |
| 2008/0208783 A1 | 8/2008 | Jaros et al. | |
| 2008/0208915 A1 | 8/2008 | George et al. | |
| 2008/0208966 A1 | 8/2008 | Edwards et al. | |
| 2009/0006289 A1 | 1/2009 | Jaros et al. | |
| 2009/0116413 A1 | 5/2009 | George | |
| 2009/0150311 A1 | 6/2009 | George | |
| 2009/0240886 A1 | 9/2009 | Sayfan et al. | |
| 2009/0313193 A1 | 12/2009 | Hawkins et al. | |
| 2010/0049677 A1 | 2/2010 | Jaros et al. | |
| 2010/0185567 A1 | 7/2010 | Niemasik et al. | |
| 2010/0191684 A1 | 7/2010 | George | |
| 2010/0207754 A1 | 8/2010 | Shostak et al. | |
| 2011/0225108 A1 | 9/2011 | Hawkins et al. | |
| 2011/0231351 A1 | 9/2011 | George et al. | |
| 2012/0005134 A1 | 1/2012 | Jaros et al. | |
| 2012/0166364 A1 | 6/2012 | Ahmad et al. | |

FOREIGN PATENT DOCUMENTS

| | | |
|---|---|---|
| WO | WO 2008/067326 | 6/2008 |
| WO | WO 2009/006231 | 1/2009 |

OTHER PUBLICATIONS

U.S. Patent Office, Final Office Action, U.S. Appl. No. 13/227,355, Dec. 19, 2012, twenty-five pages.
U.S. Patent Office, Non-final Office Action, U.S. Appl. No. 12/052,580, Dec. 21, 2012, twenty-three pages.
George, D. et al., "A Hierarchical Bayesian Model of Invariant Pattern Recognition in the Visual Cortext," Proceedings of 2005 IEEE International Joint Conference on Neural Networks, Jul. 31-Aug. 4, 2005, pp. 1812-1817, vol. 3.
George, D. et al., "Invariant Pattern Recognition Using Bayesian Inference on Hierarchical Sequences," Oct. 2004, eight pages.
Hawkins, J. et al., "Hierarchical Temporal Memory: Concepts, Theory, and Terminology," Numenta, Inc., 2006, pp. 1-19.
Numenta, Inc., "Zeta1 Algorithms Reference, Version 1.0," Mar. 1, 2007, thirty-seven pages.
Rojas, R., "Neural Networks: A Systematic Introduction," 1996, pp. 20-21, 110-112 and 311-319.
India Intellectual Property Office, First Examination Report, India Patent Application No. 1852/KOLNP/2009, Jul. 15, 2014, two pages.
India Intellectual Property Office, First Examination Report, India Patent Application No. 3585/KOLNP/2008, Jun. 2, 2015, two pages.

(56) References Cited

OTHER PUBLICATIONS

Haritaoglu, I. et al., "W4: Real-Time Surveillance of People and Their Activities," *IEEE Transactions on Pattern Analysis and Machine Intelligence*, Aug. 2000, pp. 809-830, vol. 22, No. 8.
Naphade, M. et al.,"Discovering Recurrent Events in Video Using Unsupervised Methods," *IEEE ICIP*, 2002, pp. II-13 through II-16.
United States Patent Office, Office Action, U.S. Appl. No. 13/604,543, Jul. 10, 2013, thirteen pages.
Adelson, E.H. et al., "The Perception of Shading and Reflectance," *Perception as Bayesian Inference*, 1996, pp. 409-423, Knill, D.C. et al., eds., Cambridge University Press, UK.
Agrawal, R. et al., "Mining Sequential Patterns," *IEEE*, 1995, pp. 3-14.
Ahmad, S. et al., "PowerNuPIC," Numenta, Jun. 2008, Numenta HTM Workshop, Jun. 23-24, 2008, SRI Campus, Menlo Park, CA, fifty-six pages.
Ahmad, S., "NuPIC Jumpstart—Part II," Numenta, May 2008, Numenta HTM Workshop, Jun. 23-24, 2008, SRI Campus, Menlo Park, CA, thirty-three pages.
Archive of "Numenta Platform for Intelligent Computing Programmer's Guide," Numenta, Mar. 7, 2007, pp. 1-186, www.numenta.com, [Online] Archived by http://archive.org on Mar. 19, 2007; Retrieved on Aug. 13, 2008. Retrieved from the Internet<URL:http://web.archive.org/web/20070319232606/http://www.numenta.com/for-developers/softare/pdf/nupic_prog_guide.pdf>.
Becerra, J.A. et al., "Multimodule Artificial Neural Network Architectures for Autonomous Robot Control Through Behavior Modulation," *IWANN 2003*, LNCS, pp. 169-176, vol. 2687.
Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.
Bobier, B., "Content-Based Image Retrieval Using Hierarchical Temporal Memory," Numenta HTM Workshop, Jun. 23-24, 2008, SRI Campus, Menlo Park, CA, seven pages.
Bryhni et al., "A Comparison of Load Balancing Ttechniques for Scalable Web Servers," IEEE Network, Jul./Aug. 2000, pp. 58-64.
Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.
Chapela, V., "Preventing Financial Fraud," Smart Security Services, Numenta HTM Workshop, 2009, forty pages.
Chinese Office Action, Chinese Application No. 200780007274.1m Jun. 24, 2011, five pages.
Chinese Office Action, Chinese Application No. 200580042258.7, Jul. 10, 2009, twelve pages.
Colombe, J., "A Survey of Recent Developments in Theoretical Neuroscience and Machine Vision," *Proceedings of the IEEE Applied Imagery Pattern Recognition Workshop*, 2003, nine pages.
Cormack, G.V. et al., "Data Compression Using Dynamic Markov Modelling," *The Computer Journal*, 1987, pp. 541-550, vol. 30, No. 6.
Csapo, A.B. et al., "Object Categorization Using VFA-Generated Nodemaps and Hierarchical Temporal Memories," *IEEE International Conference on Computational Cybernetics*, Oct. 7, 2007, pp. 257-262.
Curry, C. et al., "Speech Processing with HTM," Numenta HTM Workshop, Jun. 23-24, 2008, SRI Campus, Menlo Park, CA, fifty-seven pages.
Dean, T., "Learning Invariant Features Using Inertial Priors," *Annals of Mathematics and Artificial Intelligence*, 2006, pp. 223-250, vol. 47.
Demeris, Y. et al., "From Motor Babbling to Hierarchical Learning by Imitation: A Robot Developmental Pathway," *Proceedings of the Fifth International Workshop on Epigenetic Robotics: Modeling Cognitive Development in Robotic Systems*, 2005, pp. 31-37.
Dimitrova, N. et al., "Motion Recovery for Video Content Classification," *ACM Transactions on Information Systems*, Oct. 1995, pp. 408-439, vol. 13, No. 4.
Ding, C.H.Q., "Cluster Merging and Splitting in Hierarchical Clustering Algorithms," *Proceedings of the 2002 IEEE International Conference on Data Mining (ICDM 2002)*, Dec. 9, 2002, pp. 139-146.
Dolin, R. et al., "Scalable Collection Summarization and Selection," *Association for Computing Machinery*, 1999, pp. 49-58.
Dubinsky, D., "Numenta Business Strategy," Numenta, Jun. 2008, Numenta HTM Workshop, Jun. 23-24, 2008, SRI Campus, Menlo Park, CA, fifteen pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
EDSA, "Project Information," Apr. 2008, Numenta HTM Workshop, Jun. 23-24, 2008, SRI Campus, Menlo Park, CA, four pages.
Eswaran, K., "Numenta Lightning Talk on Dimension Reduction and Unsupervised Learning," Numenta HTM Workshop, Jun. 23-24, 2008, SRI Campus, Menlo Park, CA, thirty pages.
European Patent Office, Examination Report, European Application No. 05853611.1, Jun. 23, 2008, four pages.
European Patent Office, Examination Report, European Application No. 07750385.2, Apr. 21, 2009, eight pages.
European Patent Office, Examination Report, European Patent Application No. 08796030.8, Dec. 6, 2010, seven pages.
European Patent Office, Examination Report,, European Patent Application No. 07750385.2, Dec. 6, 2010, eight pages.
Farahmand, N. et al., "Online Temporal Pattern Learning," *Proceedings of the International Joint Conference on Neural Networks*, Jun. 14-19, 2009, pp. 797-802, Atlanta, GA, USA.
Felleman, D.J. et al., "Distributed Hierarchical Processing in the Primate Cerebral Cortex," *Cerebral Cortex*, Jan./Feb. 1991, pp. 1-47, vol. 1.
Fine, S. et al., "The Hierarchical Hidden Markov Model: Analysis and Applications," *Machine Learning*, 1998, pp. 41-62, vol. 32, Kluwer Academic Publishers, Boston.
Finley, M., "Exploration of Motion Capture," Qualia Labs, Jun. 24, 2008, Numenta HTM Workshop, Jun. 23-24, 2008, SRI Campus, Menlo Park, CA, thirty-six pages.
Foldiak, P., "Learning Invariance from Transformation Sequences," *Neural Computation*, 1991, pp. 194-200, vol. 3, No. 2.
Fukushima, K., "Neocognitron: A Self-Organizing Neural Network Model for a Mechanism of Pattern Recognition Unaffected by Shift in Position," *Biol. Cybernetics*, 1980, pp. 193-202, vol. 36.
Garalevicius, S., "Memory-Prediction Framework for Pattern Recognition: Performance and Suitability of the Bayesian Model of Visual Cortex," *American Association of Artificial Intelligence*, 2007, six pages.
George, D. "Thesis: How the Brain Might Work," Dept. of Electrical Engineering and the Committee on Graduate Studies of Stanford University, Jun. 2008, one-hundred ninety-one pages.
George, D. et al., "A Hierarchical Bayesian Model of Invariant Pattern Recognition in the Visual Cortex," Mar. 2005.
George, D. et al., "Invariant Pattern Recognition Using Bayesian Inference on Hierarchical Sequences," Technical Report, Sep. 17, 2004, pp. 1-8.
George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.
George, D. et al., "Towards a Mathematical Theory of Cortical Micro-circuits," *PLoS Computational Biology*, Oct. 2009, vol. 5, Issue 10, twenty-six pages.
Gottschalk, K. et al., "Introduction to Web Services Architecture," *IBM Systems Journal*, 2002, pp. 170-177, vol. 41, No. 2.
Guerrier, P., "A Generic Architecture for On-Chip Packet-Switched Interconnections," *Association for Computing Machinery*, 2000, pp. 250-256.

(56) References Cited

OTHER PUBLICATIONS

Guinea, D. et al., "Robot Learning to Walk: An Architectural Problem for Intelligent Controllers," *Proceedings of the 1993 International Symposium on Intelligent Control*, Aug. 1993, pp. 493-498, Chicago, USA.

Guo, C-E. et al., "Modeling Visual Patterns by Integrating Descriptive and Generative Methods," *International Journal of Computer Vision*, May 29, 2003, pp. 5-29, vol. 53, No. 1.

Haitani, R. et al., "Vitamin D Toolkit, Introduction," Jun. 24, 2008, Numenta HTM Workshop, Jun. 23-24, 2008, SRI Campus, Menlo Park, CA, eleven pages.

Haitani, R., "Smart Video: A Disruptive Market Opportunity for HTM," Numenta HTM Workshop, 2009, twelve pages.

Han, K. et al., "Automated Robot Behavior Recognition Applied to Robotic Soccer," *In Proceedings of the IJCAI-99 Workshop on Team Behaviors and Plan Recognition*, 1999, six pages.

Hartung, J. et al., "Presentation: Support for the Use of Hierarchical Temporal Memory Systems in Automated Design Evaluation: A First Experiment," Numenta HTM Workshop, 2009, thirty-one pages.

Hartung, J. et al., "Support for the Use of Hierarchical Temporal Memory Systems in Automated Design Evaluation: A First Experiment," *Proceedings of the ASME 2009 Int'l. Design Engineering Technical Conferences & Computers and Information in Engineering Conference*, Aug. 30-Sep. 2, 2009, ten pages, San Diego, CA, USA.

Hasegawa, Y. et al., "Learning Method for Hierarchical Behavior Controller," *Proceedings of the 1999 IEEE International Conference on Robotics & Automation*, May 1999, pp. 2799-2804.

Hawkins, J. "Hierarchical Temporal Memory: History-Progress—Today-Tomorrow," HTM Workshop, Jun. 2009, twenty-four pages.

Hawkins, J. "Prediction Toolkit Overview," Numenta HTM Workshop, 2009, four pages.

Hawkins, J. et al., "Hierarchical Temporal Memory, Concepts, Theory, and Terminology," Numenta, Jan. 27, 2007, pp. 1-20.

Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.

Hawkins, J. et al., "Hierarchical Temporal Memory: Concepts, Theory and Terminology," Numenta, Mar. 27, 2007, [Online] [Retrieved on Oct. 7, 2008] Retrieved from the Internet<URL:http://www.numenta.com/Numenta_HTM_Concepts.pdf>.

Hawkins, J. et al., "Hierarchical Temporal Memory: Concepts, Theory and Terminology," Numenta, May 10, 2006, [Online] [Retrieved on Oct. 7, 2008] Retrieved from the Internet<URL:http://www.numenta.com/Numenta_HTM_Concepts.pdf>.

Hawkins, J. et al., "On Intelligence," Sep. 2004, Times Books, Henry Holt and Company, New York, NY 10011.

Hawkins, J. et al., "Sequence Memory for Prediction, Inference and Behaviour," *Philosophical Transactions of the Royal Society B*, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full.pdf.>.

Hawkins, J., "Why Can't a Computer Be More Like a Brain?" *IEEE Spectrum*, Apr. 1, 2007, pp. 21-26, vol. 44, No. 4.

Hernandez-Gardiol, N. et al., "Hierarchical Memory-Based Reinforcement Learning," *Proceedings of Neural Information Processing Systems*, 2001, seven pages.

Hinton, G.E. et al., "The "Wake-Sleep" Algorithm for Unsupervised Neural Networks," *Science*, May 26, 1995, pp. 1158-1161, vol. 268.

Hoey, "Hierarchical unsupervised learning of facial expression categories," *IEEE*, 2001, 0-7695-1293-3, pp. 99-106.

"HTM Algorithms," Numenta®, Jun. 2008, Numenta HTM Workshop, Jun. 23-24, 2008, SRI Campus, Menlo Park, CA, 67 pages.

"HTM Optimized Drug Therapy," SDSystem24.com, Numenta HTM Workshop, Jun. 2324, 2008, SRI Campus, Menlo Park, CA 7 pages.

"HTM Workshop, Jumpstart," Numenta®, Jun. 2008, Numenta HTM Workshop, Jun. 23-24, 2008, SRI Campus, Menlo Park, 86 pages.

Hyvarinen, A. et al., "Bubbles: A Unifying Framework for Low-Level Statistical Properties of Natural Image Sequences," *J. Opt. Soc. Am. A.*, 2003, pp. 1237-1252, vol. 20, No. 7.

Isard, M. et al., "ICONDENSATION: Unifying Low-Level and High-Level Tracking in a Stochastic Framework," *Lecture Notes in Computer Science 1406*, 1998, pp. 893-908, Burkhardt, H. et al., ed., Springer-Verlag, Berlin.

Kim, J. et al., "Hierarchical Distributed Genetic Algorithms: A Fuzzy Logic Controller Design Application," *IEEE Expert*, Jun. 1996, pp. 76-84.

Kuenzer, A. et al., "An Empirical Study of Dynamic Bayesian Networks for User Modeling," *Proceedings of the UM 2001 Workshop on Machine Learning*, ten pages.

Lee, T.S. et al., "Hierarchical Bayesian Inference in the Visual Cortex," *J. Opt. Soc. Am. A. Opt. Image. Sci. Vis.*, Jul. 2003, pp. 1434-1448, vol. 20, No. 7.

Lenser, S. et al., "A Modular Hierarchical Behavior-Based Architecture," *RoboCup 2001, LNAI 2377*, 2002, pp. 423-428, Birk, A. et al, (eds.), Springer-Verlag, Berlin, Heidelberg.

Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.

Lewicki, M.S. et al., "Bayesian Unsupervised Learning of Higher Order Structure," *Proceedings of the 1996 Conference in Advances in Neural Information Processing Systems 9*, pp. 529-535.

Lim, "Estimation of Occlusion and Dense Motion Fields in a Bidirectional Bayesian Framework," *IEEE Transactions on Pattern Analysis and Machine Intelligence*, 2002, pp. 712-718, vol. 24, No. 5.

Lo, J. "Unsupervised Hebbian Learning by Recurrent Multilayer Neural Networks for Temporal Hierarchical Pattern Recognition," *Information Sciences and Systems 44th Annual Conference on Digital Object Identifier*, 2010, pp. 1-6.

Majure, L., "Unsupervised Phoneme Acquisition Using HTM," Jun. 25, 2009, eight pages.

Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.

Mari, J.-F. et al., "Temporal and Spatial Data Mining with Second-Order Hidden Markov Models," *Soft Computing—A Fusion of Foundations, Methodologies and Applications*, 2006, pp. 406-414, vol. 10, No. 5.

McDowell, C. et al., "SlugGo, a Computer Go Program," Numenta HTM Workshop, Jun. 23-24, 2008, SRI Campus, Menlo Park, CA, eighteen pages.

Miller, J. W. et al., "Biomimetic Sensory Abstraction Using Hierarchical Quilted Self-Organizing Maps," *Society of Photo-Optical Instrumentation Engineers*, 2006, eleven pages.

Mishkin, M. et al., "Hierarchical Organization of Cognitive Memory," *Phil. Trans. R. Soc. B.*, 1997, pp. 1461-1467, London.

Mitrovic, A., "An Intelligent SQL Tutor on the Web," International Journal of Artificial Intelligence in Education, 2003, pp. 171-195, vol. 13.

Muckli, L., "Predictive Coding in Apparent Motion," University of Glasgow, Numenta HTM Workshop, Jun. 25 2009, twelve pages.

Murphy, K. et al., "Using the Forest to See the Trees: A Graphical Model Relating Features, Objects and Scenes," *Advances in Neural Processing System*, 2004, vol. 16, eight pages.

Murray, S.O. et al., "Shaper Perception Reduces Activity in Human Primary Visual Cortex," *Proceedings of the Nat. Acad. of Sciences of the USA*, Nov. 2002, pp. 15164-151169, vol. 99, No. 23.

Nair, D. et al., "Bayesian Recognition of Targets by Parts in Second Generation Forward Looking Infrared Images," *Image and Vision Computing*, 2000, pp. 849-864, vol. 18.

Namphol, A. et al., "Image Compression with a Hierarchical Neural Network," *IEEE transactions on Aerospace and Electronic Systems*, Jan. 1996, pp. 326-338, vol. 32, No. 1.

(56) References Cited

OTHER PUBLICATIONS

Naphade, M. et al., "A Probabilistic Framework for Semantic Video Indexing, Filtering, and Retrieval," *IEEE Transactions on Multimedia*, Mar. 2001, pp. 141-151, vol. 3, No. 1.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.
Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Node Algorithms Guide NuPIC 1.6," Numenta, Jul. 22, 2008, pp. 1-7.
Numenta, Inc., "Numenta Node Algorithms Guide NuPIC 1.6," Numenta, Jun. 13, 2008, pp. 1-6.
Numenta, Inc., "Numenta Platform for Intelligent Computing: Programmer's Guide Version 1.0," Mar. 2007, seventy-seven pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.
Numenta, Inc., "Zeta1 Algorithms Reference, Version 1.2," Numenta Inc., Jun. 8, 2007, pp. 1-38.
Numenta, Inc., "Zeta1 Algorithms Reference, Version 1.3," Numenta Inc., Aug. 22, 2007, pp. 1-41.
Numenta, Inc., "Zeta1 Algorithms Reference, Version 1.5," Numenta Inc., Aug. 24, 2007, pp. 1-45.
Olshausen, B.A. et al., "A Neurobiological Model of Visual Attention and Invariant Pattern Recognition Based on Dynamic Routing Information," *Journal of Neuroscience*, Nov. 1993, pp. 4700-4719, vol. 13, No. 11.
Park, S. et al., "Recognition of Two-person Interactions Using a Hierarchical Bayesian Network," *ACM SIGMM International Workshop on Video Surveillance (IWVS)* 2003, pp. 65-76, Berkeley, USA.
PCT International Search Report and Written Opinion, PCT Application No. PCT/US2005/044729, May 14, 2007, twelve pages.
PCT International Search Report and Written Opinion, PCT Application No. PCT/US2007/003544, Jun. 16, 2008, ten pages.
PCT International Search Report and Written Opinion, PCT Application No. PCT/US07/85661, Jun. 13, 2008, six pages.
PCT International Search Report and Written Opinion, PCT Application No. PCT/US08/55389, Jul. 25, 2008, seven pages.
PCT International Search Report and Written Opinion, PCT Application No. PCT/US08/55352, Aug. 1, 2008, seven pages.
PCT International Search Report and Written Opinion, PCT Application No. PCT/US2008/054631, Aug. 18, 2008, twelve pages.
PCT International Search Report and Written Opinion, PCT Application No. PCT/US2008/068435, Oct. 31, 2008, eleven pages.
PCT International Search Report and Written Opinion, PCT Application No. PCT/US2009/035193, Apr. 22, 2009, eleven pages.
PCT International Search Report and Written Opinion, PCT Application No. PCT/US2011/028231, May 19, 2011, nine pages.
PCT International Search Report and Written Opinion, PCT Application No. PCT/US2009/047250, Sep. 25, 2009, twelve pages.
PCT International Search Report and Written Opinion, PCT Application No. PCT/US2008/080347, Dec. 10, 2008, six pages.
Pearl, J., "Probabilistic Reasoning in Intelligent Systems: Networks of Plausible Inference," 1988, pp. 143-223, Morgan Kaufmann Publishers, Inc.
Poppel, E., "A Hierarchical Model of Temporal Perception," *Trends in Cognitive Sciences*, May 1997, pp. 56-61, vol. 1, No. 2.
"Problem Solving with HTMs," Numenta®, Jun. 2008, Numenta HTM Workshop, Jun. 23-24, 2008, SRI Campus, Menlo Park, CA, 23 pages.
Rao, R. et al., "Predictive Coding in the Visual Cortex: A Functional Interpretation of Some Extra-classical Receptive-field Effects," *Nature Neuroscience*, Jan. 1999, pp. 79-87, vol. 2, No. 1.
Riesenhuber, M. et al., "Hierarchical Models of Object Recognition in Cortex," *Nature Neuroscience*, Nov. 1999, pp. 1019-1025, vol. 2, No. 11.
Ross, L., "Discovering and Using Patterns in Plant Floor Data," Numenta HTM Workshop, Jun. 23-24, 2008, SRI Campus, Menlo Park, CA, twelve pages.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
sdsystem24.com, "HTM Optimized Drug Therapy," Numenta HTM Workshop, Jun. 23-24, 2008, SRI Campus, Menlo Park, CA, seven pages.
Sinha, P. et al., "Recovering Reflectance and Illumination in a World of Painted Polyhedra," *Fourth International Conference on Computer Vision*, Berlin, May 11-14, 1993, pp. 156-163, IEEE Computer Society Press, Los Alamitos, CA.
Spence, C. et al., "Varying Complexity in Tree-Structured Image Distribution Models," *IEEE Transactions on Image Processing*, Feb. 2006, pp. 319-330, vol. 15, No. 2.
Starzyk, J.A. et al., "Spatio-Temporal Memories for Machine Learning: A Long-Term Memory Organization," *IEEE Transactions on Neural Networks*, May 2009, pp. 768-780, vol. 20, No. 5.
Stringer, S.M. et al., "Invariant Object Recognition in the Visual System with Novel Views of 3D Objects," *Neural Computation*, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial Intelligence Laboratory, Massachusetts Institute of Technology, Cambridge, MA, USA, eleven pages.
Thomson, A.M. et al., "Interlaminar Connections in the Neocortex," *Cerebral Cortex*, 2003, pp. 5-14, vol. 13, No. 1.
Thornton, J. et al., "Robust Character Recognition Using a Hierarchical Bayesian Network," *Proceedings of the 19th Australian Joint Conference on Artifical Intelligence*, 2006, pp. 1259-1264.
Tsinarakis, G.J. et al. "Modular Petri Net Based Modeling, Analysis and Synthesis of Dedicated Production Systems," *Proceedings of the 2003 IEEE International Conference on Robotics and Automation*, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," *Journal of Intelligent Manufacturing*, 2005, vol. 16, pp. 67-92.
Tsukada, M, "A Theoretical Model of the Hippocampal-Cortical Memory System Motivated by Physiological Functions in the Hippocampus", *Proceedings of the 1993 International Joint Conference on Neural Networks*, Oct. 25, 1993, pp. 1120-1123, vol. 2.

(56) References Cited

OTHER PUBLICATIONS

U.S. Office Action, U.S. Appl. No. 11/010,243, Jul. 12, 2007, twelve pages.
U.S. Office Action, U.S. Appl. No. 11/147,069, Jan. 9, 2007, twenty-seven pages.
U.S. Office Action, U.S. Appl. No. 11/147,069, Jul. 29, 2009, forty-three pages.
U.S. Office Action, U.S. Appl. No. 11/147,069, Jan. 9, 2009, thirty-eight pages.
U.S. Office Action, U.S. Appl. No. 11/147,069, May 15, 2008, thirty-seven pages.
U.S. Office Action, U.S. Appl. No. 11/147,069, May 29, 2007, thirty-six pages.
U.S. Office Action, U.S. Appl. No. 11/147,069, Oct. 30, 2007, thirty-four pages.
U.S. Office Action, U.S. Appl. No. 11/351,437, Aug. 23, 2007, sixteen pages.
U.S. Office Action, U.S. Appl. No. 11/351,437, Feb. 20, 2008, six pages.
U.S. Office Action, U.S. Appl. No. 11/622,447, May 28, 2008, eighteen pages.
U.S. Office Action, U.S. Appl. No. 11/622,448, Apr. 30, 2008, seventeen pages.
U.S. Office Action, U.S. Appl. No. 11/622,448, Aug. 24, 2007, nineteen pages.
U.S. Office Action, U.S. Appl. No. 11/622,454, Jun. 3, 2008, thirteen pages.
U.S. Office Action, U.S. Appl. No. 11/622,454, Mar. 30, 2009, eleven pages.
U.S. Office Action, U.S. Appl. No. 11/622,455, Apr. 21, 2010, twelve pages.
U.S. Office Action, U.S. Appl. No. 11/622,456, Mar. 20, 2009, nine pages.
U.S. Office Action, U.S. Appl. No. 11/622,456, May 7, 2008, fourteen pages.
U.S. Office Action, U.S. Appl. No. 11/622,456, Nov. 6, 2008, seven pages.
U.S. Office Action, U.S. Appl. No. 11/622,457, Apr. 21, 2009, six pages.
U.S. Office Action, U.S. Appl. No. 11/622,457, Aug. 24, 2007, ten pages.
U.S. Office Action, U.S. Appl. No. 11/622,457, May 6, 2008, fourteen pages.
U.S. Office Action, U.S. Appl. No. 11/622,457, Nov. 20, 2008, eight pages.
U.S. Office Action, U.S. Appl. No. 11/622,458, Apr. 1, 2010, sixteen pages.
U.S. Office Action, U.S. Appl. No. 11/680,197, Mar. 23, 2010, twelve pages.
U.S. Office Action, U.S. Appl. No. 11/680,197, Sep. 14, 2010, seventeen pages.
U.S. Office Action, U.S. Appl. No. 11/713,157, Mar. 31, 2010, fourteen pages.
U.S. Office Action, U.S. Appl. No. 11/945,919, Sep. 7, 2010, nineteen pages.
U.S. Office Action, U.S. Appl. No. 12/029,434, Mar. 28, 2011, twenty-four pages.
U.S. Office Action, U.S. Appl. No. 12/029,434, Nov. 8, 2011, thirty-six pages.
U.S. Office Action, U.S. Appl. No. 12/039,630, Nov. 24, 2010, ten pages.
U.S. Office Action, U.S. Appl. No. 12/039,652, Mar. 29, 2011, fifteen pages.
U.S. Office Action, U.S. Appl. No. 12/040,849, Feb. 3, 2011, thirteen pages.
U.S. Office Action, U.S. Appl. No. 12/040,849, Jul. 1, 2011, eighteen pages.
U.S. Office Action, U.S. Appl. No. 12/147,348, Oct. 11, 2011, forty-three pages.
U.S. Office Action, U.S. Appl. No. 12/288,185, Sep. 15, 2010, eleven pages.
U.S. Office Action, U.S. Appl. No. 12/751,808, Oct. 28, 2010, thirteen pages.
U.S. Office Action, U.S. Appl. No. 13/151,928, Aug. 2, 2011, eight pages.
U.S. Office Action, U.S. Appl. No. 13/218,194, Oct. 5, 2012, fourteen pages.
U.S. Office Action, U.S. Appl. No. 13/227,355, May 25, 2012, twenty-four pages.
U.S. Office Action, U.S. Appl. No. 13/333,865, May 16, 2012, twenty-four pages.
U.S. Office Action, U.S. Appl. No. 12/483,642, Aug. 10, 2012, seven pages.
U.S. Office Action, U.S. Appl. No. 12/483,642, Apr. 26, 2012, twelve pages.
U.S. Appl. No. 13/218,170, filed Aug. 25, 2011.
U.S. Appl. No. 13/218,194, filed Aug. 25, 2011.
U.S. Appl. No. 13/218,202, filed Aug. 25, 2011.
U.S. Appl. No. 13/227,355, filed Sep. 7, 2011.
U.S. Appl. No. 13/333,865, filed Dec. 21, 2011.
U.S. Appl. No. 13/415,713, filed Mar. 8, 2012.
U.S. Appl. No. 13/604,543, filed Sep. 5, 2012.
U.S. Appl. No. 12/029,434, filed Feb. 11, 2008.
Van Essen, D.C. et al., "Information Processing Strategies and Pathways in the Primate Visual System," *An Introduction to Neural and Electronic Networks*, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
"Vision Framework," Numenta®, Jun. 2008, Numenta HTM Workshop, Jun. 23-24, 2008, SRI Campus, Menlo Park, CA 36 pages.
Vlajic, "Vector Quantization of Images Using Modified Adaptive Resonance Algorithm for Hierarchical Clustering," *IEEE Transactions on Neural Networks*, 2001, pp. 1147-1162, vol. 12, No. 5.
Weiss, R. et al., "HyPursuit: A Hierarchical Network Search Engine that Exploits Content-Link Hypertext Clustering," *Proceedings of the Seventh Annual ACM Conference on Hypertext*, Mar. 16-20, 1996, pp. 180-193, Washington, D.C., USA.
Wiskott, L. et al., "Slow Feature Analysis: Unsupervised Learning of Invariances," *Neural Computation*, 2002, pp. 715-770, vol. 14, No. 4.
Wu, G. et al., "Multi-camera Spatio-temporal Fusion and Biased Sequence-data Learning for Security Surveillance," *Association for Computing Machinery*, 2003, pp. 528-538.
Yedidia, J.S. et al., "Understanding Belief Propagation and its Generalizations," *Joint Conference on Artificial Intelligence (IJCAI 2001)*, Aug. 4-10, 2001, Seattle, WA, USA, thirty-five pages.
Zemel, R.S., "Cortical Belief Networks," *Computational Models for Neuroscience*, 2003, pp. 267-287, Hecht-Nielsen, R. et al., eds., Springer-Verlag, New York.
Mohan, S.K., "Accuracy and Multi-core Performance of Machine Learning Algorithms for Handwritten Character Recognition," Master of Science Thesis, Aug. 2009, Clemson University, South Carolina, USA, fifty-nine pages.
Yalamanchili, P.K., "Hierarchical Bayesian Cortical Models: Analysis and Acceleration on Multicore Architectures," Master of Science Thesis, Aug. 2009, Clemson University, South Carolina, USA, sixty-six pages.
Bobier, B., et al., "Content-Based Image Retrieval Using Hierarchical Temporal Memory," Proceedings of the 16th International Conference on Multimedia 2008, 2008, pp. 925-928.

\* cited by examiner

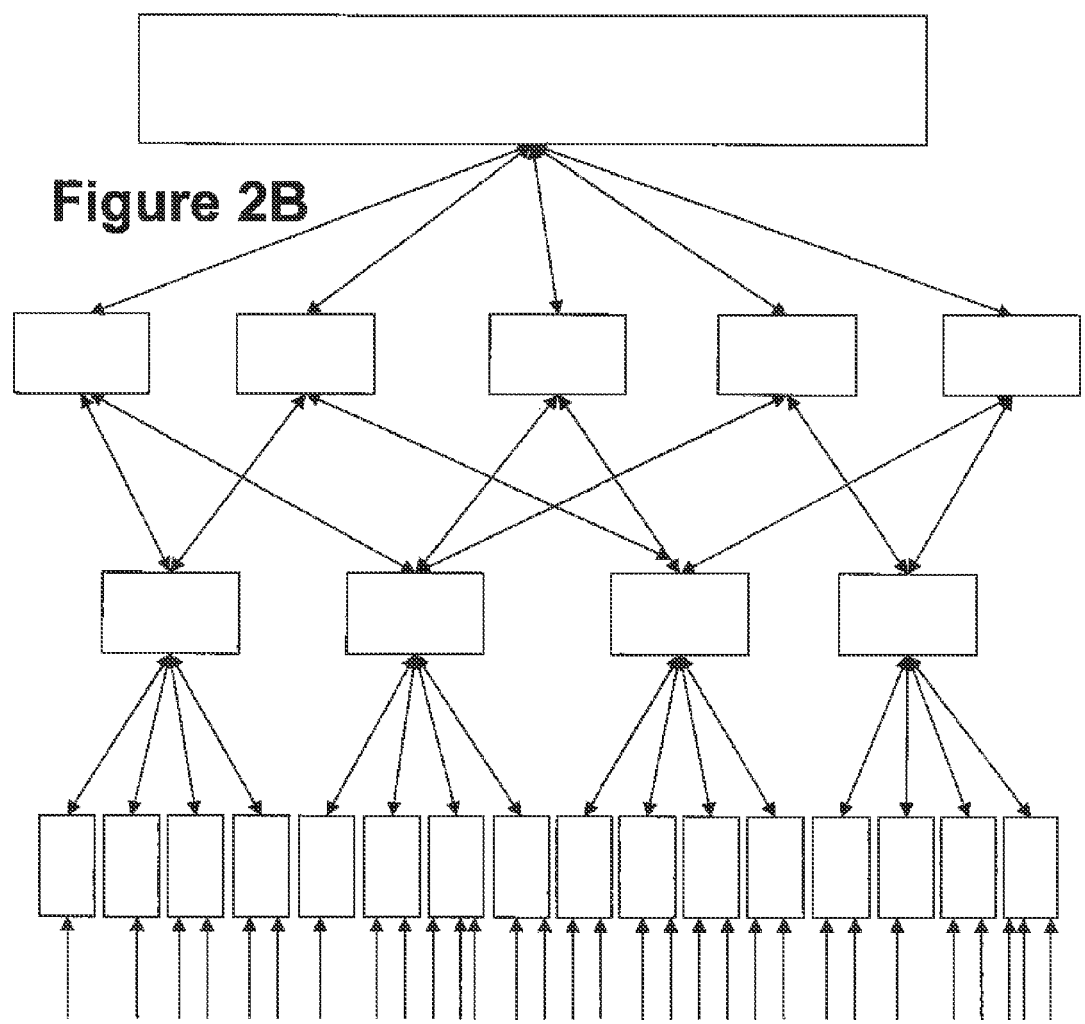

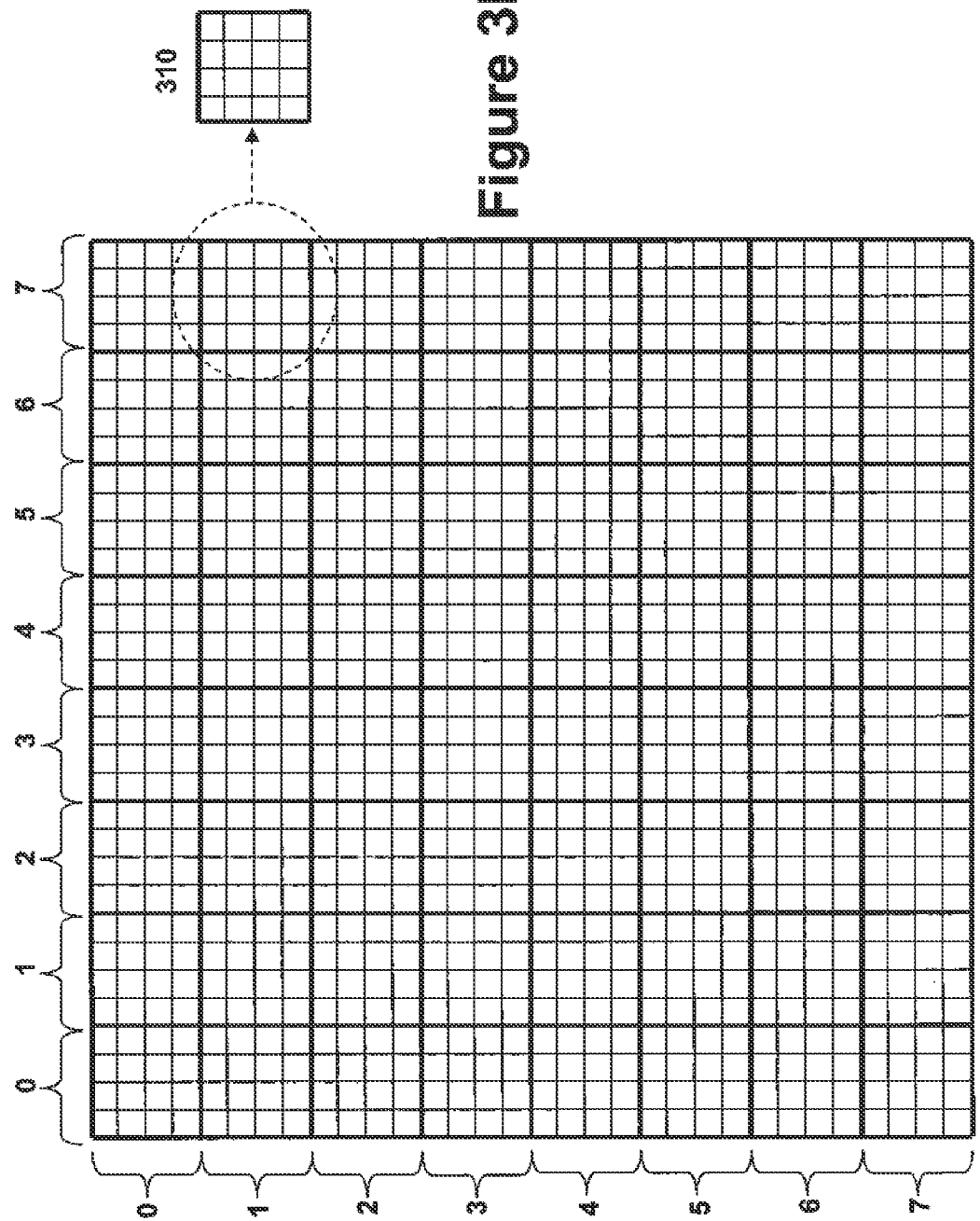

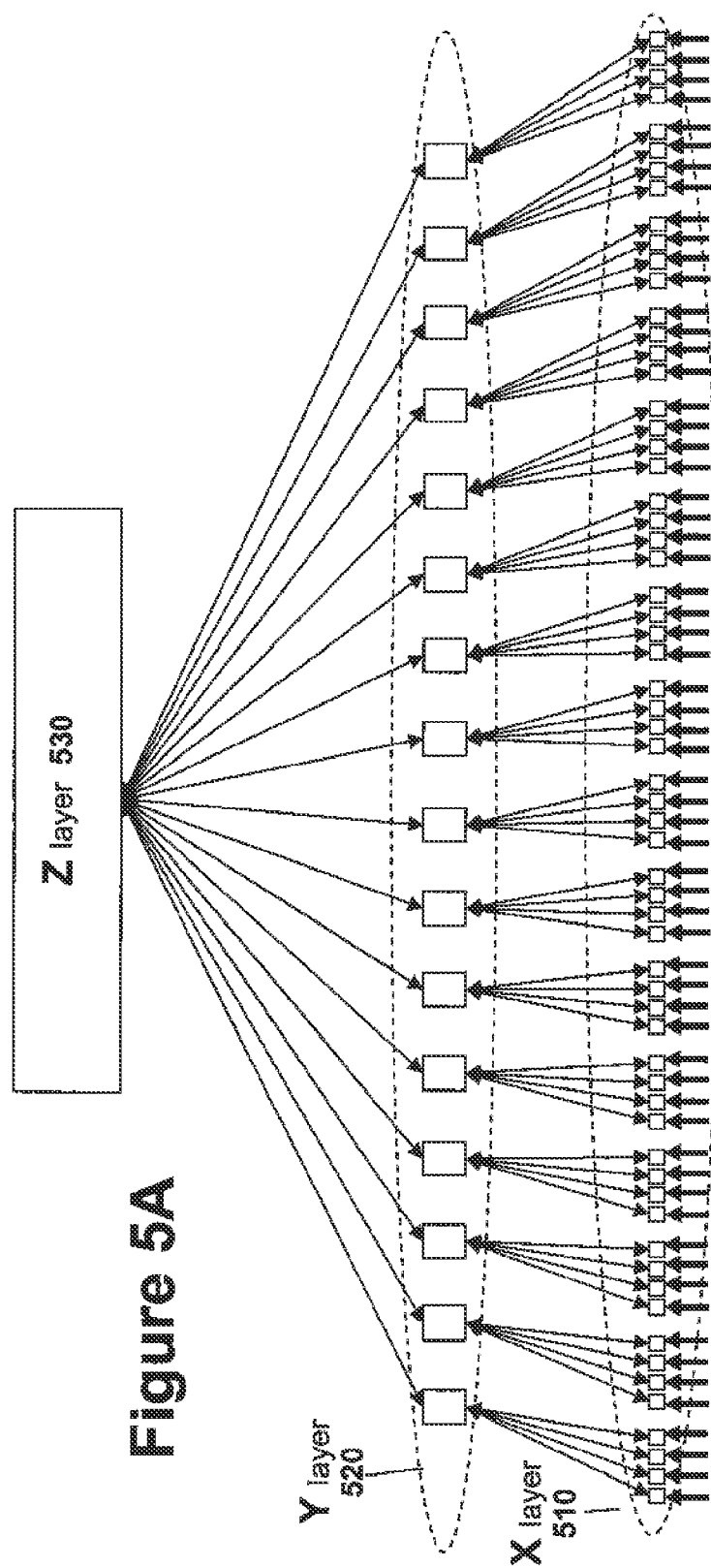

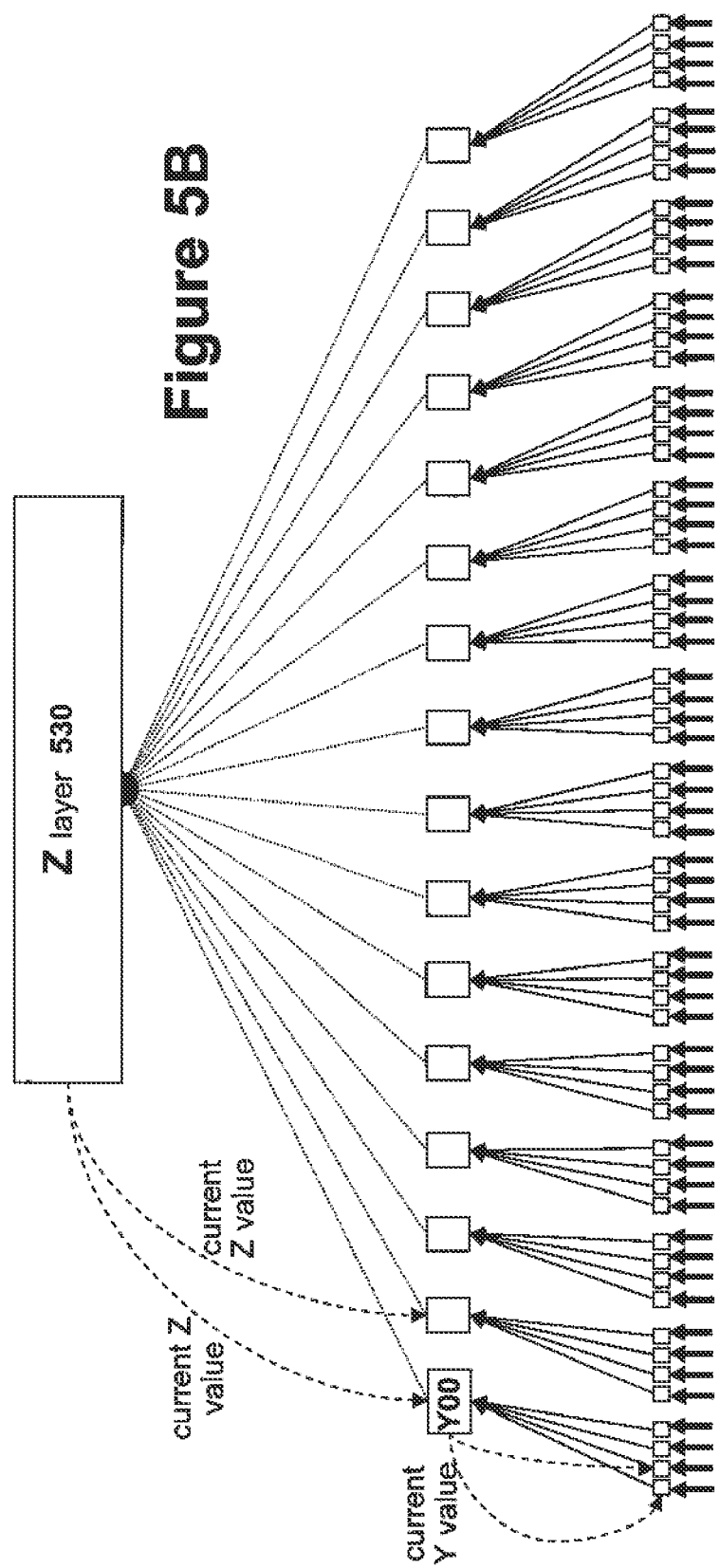

METHODS, ARCHITECTURE, AND APPARATUS FOR IMPLEMENTING MACHINE INTELLIGENCE AND HIERARCHICAL MEMORY SYSTEMS

RELATED APPLICATIONS

This is a continuation of co-pending U.S. patent application Ser. No. 12/040,849 filed on Feb. 29, 2008 (issued as U.S. Pat. No. 8,175,981), which is a divisional of U.S. patent application Ser. No. 11/010,243 filed on Dec. 10, 2004 (abandoned), which are incorporated by reference herein in their entirety.

FIELD OF THE INVENTION

The present invention relates to the field of memory systems and machine intelligence. In particular the present invention discloses methods, apparatuses, and architecture for implementing memory systems that exhibit machine intelligence.

BACKGROUND OF THE INVENTION

The field of Artificial Intelligence (AI) has existed for over fifty years. Many useful programs have been created from artificial intelligence research such as expert systems, skilled game playing programs, and neural network based pattern matching systems. Many of the programs can accomplish feats that no human could possibly match due to the significant computational power of modem computer systems. However, no computer program has ever shown the type of understanding exhibited by the brain of even a young child.

There have been two main schools of artificial intelligence research: classic artificial intelligence research and neural network research. These two main schools of artificial intelligence research differ in how the problem of attempting to create machine intelligence is addressed. The main difference between the two schools is in how the two schools of artificial intelligence research are related to known information about the human brain.

Classic artificial intelligence proponents make no attempt to examine or replicate the manner in which the human brain operates. Proponents of classic artificial intelligence attempt to create programs that mimic basic human behaviors or problem solving in a manner that does not incorporate any fundamental understanding of how human brains actually work. People that followed the classic artificial intelligence research school of thought felt that they should not be limited by the particular solution discovered by nature. This school of thought has some resonance since we created flying machines that do not operate the way birds fly and we created fast land travel machines that do not operate the way a cheetah runs.

To create classic artificial intelligence, a programmer examines the problem to be solved or the human behavior to be mimicked and then determines an algorithmic solution to the problem. The programmer then codes the algorithmic solution in computer software. Examples of classic artificial intelligence programs include chess playing programs and expert system programs. These programs use an algorithm solution and a set of rules created by a human expert in order to solve complex problems, respectively. However, these programs generally have no ability to learn. These programs can only handle the single problem that was addressed. Nor can such artificial intelligence programs generalize upon the knowledge incorporated into such programs in order to address completely novel input data.

Neural network proponents have attempted to create limited intelligent systems by replicating the operation of interconnected neural cells. There is a large body of knowledge that describes how individual neural cells (neurons) operate and how connected neurons interact. Neural network proponents have built systems, known as "neural networks", based upon this knowledge about neuron operation. Thus, neural network systems operate in a manner similar to a set of interconnected neurons. Neural network researchers are therefore often referred to as 'connectionists.' Interneuron connection strengths are known as synaptic weights and are used to store the learned knowledge.

Before being used, a neural network must first be trained with a set of training information. The training information consists of input vectors with associated output vectors that are deemed to be the correct output for the associated input vector. During the training, the connections between the various simulated neurons in the neural network are adjusted such that the input vectors generate the associated output vectors (or a close approximation).

Once trained, a neural network is used by presenting a novel input vector to the neural network such that an output vector is generated. With a proper neural network design and adequate training data, the neural network should generate the appropriate output vector for the given input vector. Neural networks have been proven to be useful in some limited applications.

Although there have been some limited successes with neural networks, most neural network systems are relatively primitive. Most neural network systems are simply a three layer structure with a set of input nodes, a set of middle nodes (also known as the 'hidden nodes'), and a set of output nodes. Although neural network systems are able to 'learn' in a very simple sense and exhibit a limited ability to generalize, there is clearly no real understanding of the world. Neural network systems merely create an internal function that best maps the training input vectors to the associated training output vectors. Thus, a neural network is only able to generalize in a limited sense by applying the internal function to the novel input vectors.

To really advance the field of artificial intelligence, a new paradigm for artificial intelligence would be desirable. The classic artificial intelligence approach has probably failed since we do not fully understand the essence of intelligence. And without understanding the essence of intelligence, how can one be expected to encode intelligence in a computer program? The neural network approach has provided very limited results since neural networks generally emulate only relatively few interconnected neurons and does so in a manner that ignores most of the complex anatomy of the brain. Since current estimates postulate that the neocortex of the human brain contains approximately thirty billion neurons, such simple neural networks will never provide the real intelligence exhibited by the human brain. Thus, to advance the state of artificial intelligence it would be desirable to embark on a new approach that avoids the problems of the current main approaches.

SUMMARY OF THE INVENTION

The present invention proposes creating sophisticated memory systems and intelligent machines by constructing a memory system with a hierarchical architecture. Specifically, a system may comprise a plurality of individual cortical processing units arranged into a hierarchical structure. Each individual cortical processing unit receives a sequence of patterns as input. Each cortical processing unit processes the received input sequence of patterns and outputs another pattern. As several input sequences are processed by a cortical processing unit, it will therefore generate a sequence of patterns on its output. The sequence of patterns on its output may be passed as an input to one or more cortical processing units in next higher layer of the hierarchy. A lowest layer of cortical processing units may receive sensory input from the outside world. The sensory input also comprises a sequence of patterns.

Each individual cortical processing unit includes a memory that is used to help process the sequence of patterns received on the input. The memory may comprise previously encountered sequences of patterns that contain structure. An input sequence of patterns may be deemed to contain structure if that sequence of patterns has been encountered more than once. An individual cortical processing unit can use the stored sequences of patterns containing structure in order to later 'recognize' such structured sequences in the input stream.

When a previously encountered sequence of patterns is recognized by a cortical processing unit, the cortical processing unit can report such recognition to higher layer cortical processing units. The output to the higher layer cortical processing units may comprise an identifier of the recognized pattern sequence. Over time, the output stream containing identifiers of recognized sequences comprises a sequence of patterns itself. That output stream of patterns may comprise an input that will be processed in a similar manner by the cortical processing unit in the next higher cortical processing unit layer. The outputs of more than one lower layer cortical processing unit may be joined together such that the joined outputs form a sequence of patterns that may be processed.

A cortical processing unit may also use the memorized sequence of patterns in order to make predictions about the incoming sequences in order to resolve ambiguous information. Specifically, when a cortical processing unit determines that it is currently receiving a known sequence, the cortical processing unit may predict the next pattern to be received in the sequence. The processing unit may use the prediction to interpret the next pattern received. For example, if the input stream into a cortical processing unit is ambiguous, then that cortical processing unit may use the predicted pattern to help identify the next input pattern.

The cortical processing unit may further provide the predicted next pattern down to the next lower cortical processing units. The lower cortical processing units may interpret this as a prediction of the next sequence that the lower unit will encounter (and hence output to the higher layer). Such prediction information may comprise information that helps the lower cortical processing unit layers correctly identify the next sequence.

The prediction information may also be considered as useful predictions of what will occur in the outside world. And if an incoming pattern significantly differs from a predicted pattern or an incoming sequence of patterns significantly differs from the predicted sequence of patterns, then there is a prediction failure. The occurrence of a prediction failure may be transmitted to a cortical processing unit in a higher layer. A cortical processing unit in a higher layer may be able to resolve the error. A detected error may be resolved in a number of different ways. One way to resolve the error is to adjust the cortical hierarchy's model of the world by storing a new sequence of patterns.

Other objects, features, and advantages of present invention will be apparent from the company drawings and from the following detailed description.

BRIEF DESCRIPTION OF THE DRAWINGS

The objects, features, and advantages of the present invention will be apparent to one skilled in the art in view of the following detailed description in which:

FIG. 2B illustrates an alternate hierarchical diagram for the human visual processing system of FIG. 1.

FIG. 3B illustrates the pixel grid of FIG. 3A wherein the pixel grid has been divided into a set of sixty-four pixel patches of four by four pixels that will each be examined by an individual processing unit.

FIG. 5A illustrates the hierarchy of the cortical processing units to process information from thirty-two by thirty-two grid of pixels illustrated in FIG. 3A in a prototype program.

FIG. 5B illustrates the hierarchy of FIG. 5A with feedback information that provides context.

DETAILED DESCRIPTION OF THE PREFERRED EMBODIMENT

Figure 1:
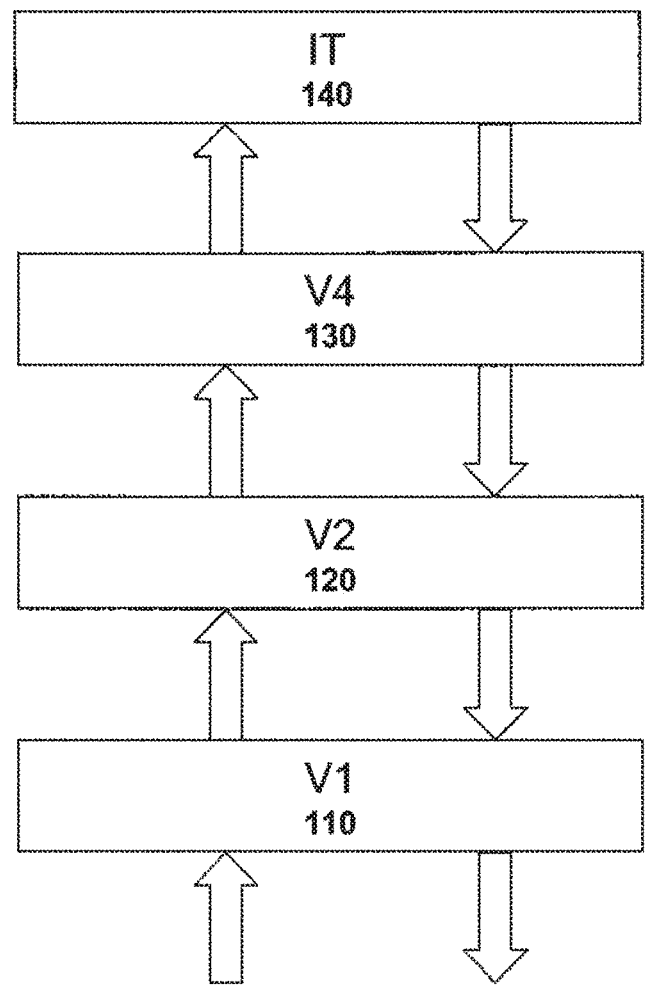
FIG. 1 illustrates a conceptual diagram of the visual processing portion of the brain concerned with recognizing forms and identifying objects.

Methods, architecture, and apparatus for implementing machine intelligence are disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to Bayesian networks for generating predictions. However, other types of systems may be used to analyze the learned information in order to generate predictions. The numerous teachings of the present invention are set forth with reference to a simple image recognition system that uses image information as sensory input. However, the principles of the present invention can be applied to any type of environment with any type of sensory input as long as there is detectable consistency within the environment.

Theory of Operation of the Human Brain

The human brain consists of billions of interconnected nerve cells (neurons). Like a computer system, the neurons of the human brain are connected to both input units and output units. The input units consist of the senses connected to our brain such as hearing, sight, smell, touch, and taste. The output units consist of controlled muscles that allow us to perform complex actions with our bodies and allow us to communicate by speaking.

But beyond that one similarity, computers and human brains are extremely different. A computer has a central processor that sequentially executes a set of instructions (with associated parameter information) retrieved from a flatly addressed memory system. In a human brain, there is no central processor. Instead, there are billions of neurons interconnected in some parallel manner wherein all the neurons operate concurrently. Nor is there a large flatly addressed memory system with perfect recall in a human brain. Instead, the human brain has billions of synapses that form connections between neurons. Each synapse in the network of synapses may be strengthened or weakened thus acting as a 'memory' in the form of modified operation of that synapse.

As set forth in the background, independent efforts at creating intelligent machines have yielded many useful computer programs. However, nothing close to real human (or other mammal) intelligence has ever been created. No one has yet figured out how to independently program a real intelligent machine. Thus, in order to build an intelligent machine, it may be wise to determine the manner in which the human brain works in order to take advantage of the operational methods incorporated in that amazing product of millions of years of evolution by natural selection.

The human brain has been studied by scientists for over a hundred years. This extensive research has lead to many independent discoveries that have revealed a large number of insights into the operation of the human brain. However, the overall operation of the human brain still largely remains a mystery. The teachings of the present invention combine a number of the discoveries about the human brain in order to create an overall theory on how the human brain operates. The operational theories mainly focus on the brain's neocortex since only mammals, the class of animals generally regarded to be the most intelligent, have a neocortex. A full description of the overall theory of operation of the brain's neocortex can be found in the book "On Intelligence" by Jeff Hawkins, Times Books, which is hereby incorporated by reference in its entirety.

With an overall theory on how the neocortex operates, these teachings can then be implemented with a machine in order to create artificial intelligence. For example, the methods of the present invention may be implemented with software on a computer system. However, the teachings can be implemented in many other formats such as directly in an integrated circuit.

Sensory Input Comprises Sequences of Patterns

The human brain is protected within the confines of the strong bone that consists of the human skull. There is no direct contact between the human brain and the outside world. To learn about the outside world, the human brain has millions of connections to sensory nerve cells located all over the human body. Millions of nerve cells on the surface of the human body provide the input of touch. Millions of rods and cones on the retina of the human eye detect light and transmit information about the detected light along the optic nerve to the brain. Thousands of sensor cells in the human ear detect different sound frequencies and transmit the detected sound information along the auditory nerve to the brain. All of this sensory information is received along different nerve pathways to the brain. The brain must then interpret all of this information to form an understanding of the outside world.

All of the different sensory input signals that are transmitted to the brain have at least two dimensions: a spatial dimension and a time dimension. The spatial dimension constitutes a collection of related sensory signals that arrive at the brain at the same time. The collective activities on related nerve fibers that are received by the brain at the same time are deemed to be a "pattern" of information in the spatial dimension. Over time, different patterns are received by the brain from each collection of related nerve fibers. The consecutive patterns received by the brain along related nerve fibers constitute a 'sequence of patterns' wherein consecutive patterns are closely related in time.

An example can easily be provided with reference to the human sense of vision. All of the input signals received by the brain from the optic nerve at a particular instant in time represent a pattern of visual information in the spatial dimension. Over time, different visual information enters our eyes as we move our eyes (in movements known as 'saccades'), move our head, or move our entire body. The constantly changing visual information received by our eyes is continually transmitted to the brain along the optic nerve. The constantly changing visual information creates different patterns on the optic nerve. The continuous stream of patterns transmitted on the optic nerve is thus a sequence of patterns of visual information.

The pattern in a spatial dimension and a sequence of patterns in the time dimension model applies to all of our different senses. With regard to hearing, different hairs in our ears are activated by different frequencies of sound. The collection of all of the different frequency signals transmitted from the ear to the brain along the auditory nerve represents a pattern of auditory information. Over time, we hear different sounds such that sequence of auditory patterns is transmitted along the auditory nerve to the brain. Our sense of touch is actually much more detailed than simply touch pressure. Touch information has a wide variety of spatial dimension aspects including pressure, temperature, pain, and location. All of this touch information that the brain receives concurrently is a pattern of touch information in the spatial dimension. Over time, the body receives a sequence of patterns of touch information.

Much of the artificial intelligence research using neural networks concerns the use of neural networks attempting to learn pattern information such that the neural network can later recognize similar patterns within novel input data. However, most of the neural network based pattern recognition research has been performed using spatial patterns with no consideration of time. For example, during a learning phase, a neural network may be presented with a collection of static images, one at a time, such as an apple, a boat, a tree, a banana, etc. The neural network is 'taught' what each presented pattern represents in order to train the neural network on different object patterns for object recognition. Later, novel image patterns are presented to the neural network such that the neural network attempts to identify an object in the novel image. There has been some success with such pattern recognition neural networks, but the success has been limited.

Human brains do not receive information in such a static manner wherein a set of completely different images are presented with no respect to time. Instead, human brains receive information as a continuous sequence of patterns from the different sensory organs. For example, our eyes receive an ever-changing sequence of images that are transmitted to the brain as a sequence of patterns on the optic nerve. Our brains learn to group different sequential images of the same object together by observing continuous motions in this world.

The sensory information in the sequence of patterns is generally highly correlated over time. For example, when a person looks out a window, much of the visual information (such as buildings, tree trunks, the ground, etc.) remains static. Some of the visual information (such as leaves blowing in the wind, a bird flying in the sky, a squirrel running across the grass, etc.) changes over time. But even the changing information is highly correlated in time since the leaves blowing in the wind do not move significantly, the bird travels in a straight line, and the squirrel moves around only on the ground in the same area.

The correlation of the information in the visual stream is very important for learning. For example, a baby looking out the window of the previous example will learn over time that trees and buildings do not move whereas birds and squirrels do move. Thus, receiving a continual sequence of visual patterns provides a large amount of useful information for learning. Therefore, the system of the present invention proposes that the consideration of time such that a sequence of patterns is examined to be an important aspect of in the ability to learn. Thus, in many embodiments, the system of the present invention uses sequences of patterns generated over time as the stream of source information to learn from.

The Neocortex in the Brain Uses a Single 'Cortical Algorithm'

The human brain is comprised of many different parts including the cerebellum, the basal ganglia, the hypothalamus, the brain stem and the neocortex. However, it is generally agreed upon that the main area of the human brain responsible for abstract thought and substantial learning capability is the neocortex. Only the animals that exhibit the best capacity for learning (mammals) have a neocortex structure in their brains.

Different regions of the neocortex are generally used to address different problems presented to the neocortex. One region of the neocortex is used to process grammar; other regions are used for processing sounds; multiple regions are dedicated to processing visual information; and so on. Over time, scientists have attempted to map out the different functions performed by the different regions of the neocortex. The current brain function mappings of neocortex functions are relatively complex. And it has been found that the functional mappings of the neocortex only tend to vary by limited amounts from person to person.

The relatively consistent mapping of neocortex functions has lead many brain researchers to assume that each area of the brain processes the information that it receives and solves problems in different ways. However, in 1978, a neuroscientist named Vernon Mountcastle made a novel assertion. He noted that the entire neocortex had a remarkably uniform appearance and structure. The regions of neocortex that handle auditory input look the same as the regions that handle touch, which look like the regions that control muscles, which look like the regions that handle vision, which look like the regions that generate language, and so on. Mountcastle asserted that since all these different regions of the neocortex appeared uniform, then perhaps all of these different regions of the neocortex performed the same basic operation. He asserted that there is likely to be a single 'cortical algorithm' that is used throughout the neocortex to handle all of the different sensory information. Assuming that this is true, then the different regions of the cortex that perform specific functions become specialized mainly due to the particular pattern information received by that cortical region and not because of any significantly different neural structure in that cortical region.

A number of subsequent scientific studies support Mountcastle's assertion. One of the strongest pieces of evidence is the "plasticity" of the brain. As set forth above, there are many different regions of the brain that seem to be dedicated to performing very specific functions. However, it has been learned that different parts of the brain can easily adapt to handle a different function that is normally handled by another region of the neocortex. The ability to adapt operation in order to handle different circumstances is referred to as the brain's plasticity.

In one set of experiments that supports Mountcastle's uniform cortical algorithm assertion, scientists have "rewired" the output from one sensory organ on a baby animal to connect to a different region of the of the animal's neocortex. For example, the optic nerve of a baby ferret has been rewired such that the information from the optic nerve flows into an area of the ferret's neocortex that is normally used to process sound information. When the ferret with the rewired brain grows up, the ferret is able to see. The area of the ferret's brain that would normally be used to process sound information was able to adapt to processing visual information. Such experiments show that the mammal neocortex is very 'plastic' in the sense that just about any region in the mammal neocortex can adjust itself to handle whatever type of input information flows into that region.

The same plasticity has been shown to exist in human brains. For example, if the region of the neocortex that is usually dedicated to processing grammar (known as Broca's area) is damaged in the brain of a young child that has not yet learned to speak, then the child's damaged brain will adjust itself accordingly in order to adapt. Specifically, the child's brain will tend to use a different region of the brain for processing grammar (such as the same area on the other side) such that the child with a damaged brain will easily learn to speak. Many other examples of such human brain plasticity can be cited. Adults that are born deaf will use areas that are normally used to process sounds for processing visual information. Blind people will often use the region of the rear region of the brain normally used to process vision in order to learn to read Braille.

Since different regions of the neocortex can be used to handle any different problem, then there must be a single 'cortical algorithm' that is used to handle every different problem presented to the brain. This is just what Mountcastle proposed. Although Mountcastle's proposal may seem relatively simple, his discovery is actually quite profound in its implications. Specifically, if a single cortical algorithm that is used throughout the entire human neocortex can be deciphered properly, then that cortical algorithm can be reproduced in a machine to create machine intelligence. Within the context of a machine, the cortical algorithm can be used to process many different types of information streams as long as each information stream is presented as a sequence of patterns. Therefore, a single type of machine can be used to solve problems in vision, language, audition, and robotics.

The Human Neocortex is Organized Hierarchically

Over the one hundred years of human brain research, many different aspects of the cortex of the human brain have been carefully examined. However, one of the most meticulously studied aspects of the human cortex is the processing of visual information. FIG. 1 illustrates a simplified conceptual diagram that is commonly used by brain researchers to describe the visual processing portion of the human cortex concerned with recognizing forms and identifying objects in the visual information stream.

At the bottom of FIG. 1, raw visual information (the sequence of visual patterns) enters the V1 region 110. The V1 region 110 performs the initial processing of visual pattern information received from the optic nerve. The cells in the V1 region 110 are divided into cell groups wherein each cell group analyzes the information from a small area of the retina. In this document, all the neural cells in a cell group that process the same sequence of input patterns or an artificial device that emulates a cell group that processing the same sequence of patterns will be referred to as a "cortical processing unit" or a "processing unit." For example, a cell group that processes the information contained in sequence of input patterns directly from a small area of the retina may be referred to as a cortical processing unit.

The information generated by the processing units in the V1 region 110 is then passed to the V2 region 120. The V2 region 120 performs processing on the information received from the V1 region 110 and then generates processed output information that is passed to the V4 region 130. Similarly, the V4 region 130 processes the information received from the V2 region 120 and passes processed information to IT region 140. Finally, the IT region 140 receives information generated by the V4 region 130. In the IT region 140, the brain is known have been able to discern objects in the person's visual field. For example, certain cells will be activated if a particular face is visible anywhere in the person's visual field.

As illustrated in FIG. 1, raw visual sensory information is received at the bottom and then progressively processed by a series of visual processing regions. At the top region, the visual processing system is known to recognize and identify objects. Thus, the visual processing portion of brain concerned with recognizing forms illustrated in FIG. 1 has a vertical hierarchy of successive processing until a complex result (an identified object) is achieved at the top.

Laboratory tests indicate that the cells in the lower layers of the hierarchy (such as the V1 region 110) are switching (activating and deactivating) very rapidly. This is understandable since our eyes are constantly moving such that different visual information is being presented to the V1 region 110 of the cortex all the time. The V1 region 110 is also the largest cortex region of the four cortex regions conceptual illustrated in FIG. 1. Furthermore, experiments have shown that each cell group in the V1 region 110 is only receptive to a very small area of the retina. Thus, in the V1 region 110 there are many individual small cell groups responsible for processing information from each area of the retina.

As one ascends the layers of hierarchy illustrated in FIG. 1, the activity of the cells at each higher hierarchical layer become more stable than the lower hierarchical layers. Thus, as one proceeds up the hierarchy, cells respond more and more to objects in the world as opposed to simple visual constructs. Furthermore, the receptive visual fields of the cell groups in each layer become larger as one ascends the hierarchy. That is, cell groups in the low V1 region 110 only process information from a small area of the retina whereas the IT region 140 processes information from the entire visual field. Thus, each cell group in a layer above the first layer (the V1 region 140) processes information from more than one cell group from the layer below. This can be seen since a face can appear in any region of a person's visual field and the person still recognizes it as a face such that the IT region 140 must process the entire visual field.

As one ascends the hierarchy, the cell groups in each ascending layer process a larger and larger visual field such that each cell group in regions above the first layer (V1 region 110) processes the output of many cell groups from regions in the lower layers. At the top of the visual form recognition hierarchy in FIG. 1, the IT region 140 processes the entire visual field since objects can be recognized in any part of the visual field.

This information leads one to revise the simple block diagram of FIG. 1 into a block diagram having an ascending hierarchy that generally has a large number of cortical smaller processing units at the bottom and generally has fewer but larger cortical processing units on each successive hierarchical layer. This architecture allows for distributed and relatively simple processing at the bottom but concentrated and more complex processing at the top.

As set forth in the previous section, there is a single cortical algorithm that is used throughout the neocortex of the human brain. Furthermore, using the teachings in the first section on input, each cortical processing unit receives sequences of patterns that must be processed. Combining these teachings, one may deduce that each layer of the hierarchy must comprise cortical processing units that receive input in the form of a sequence of patterns but output a sequence of patterns since those output patterns will become the inputs to the cortical processing units in the next higher layer.

Figure 2A:
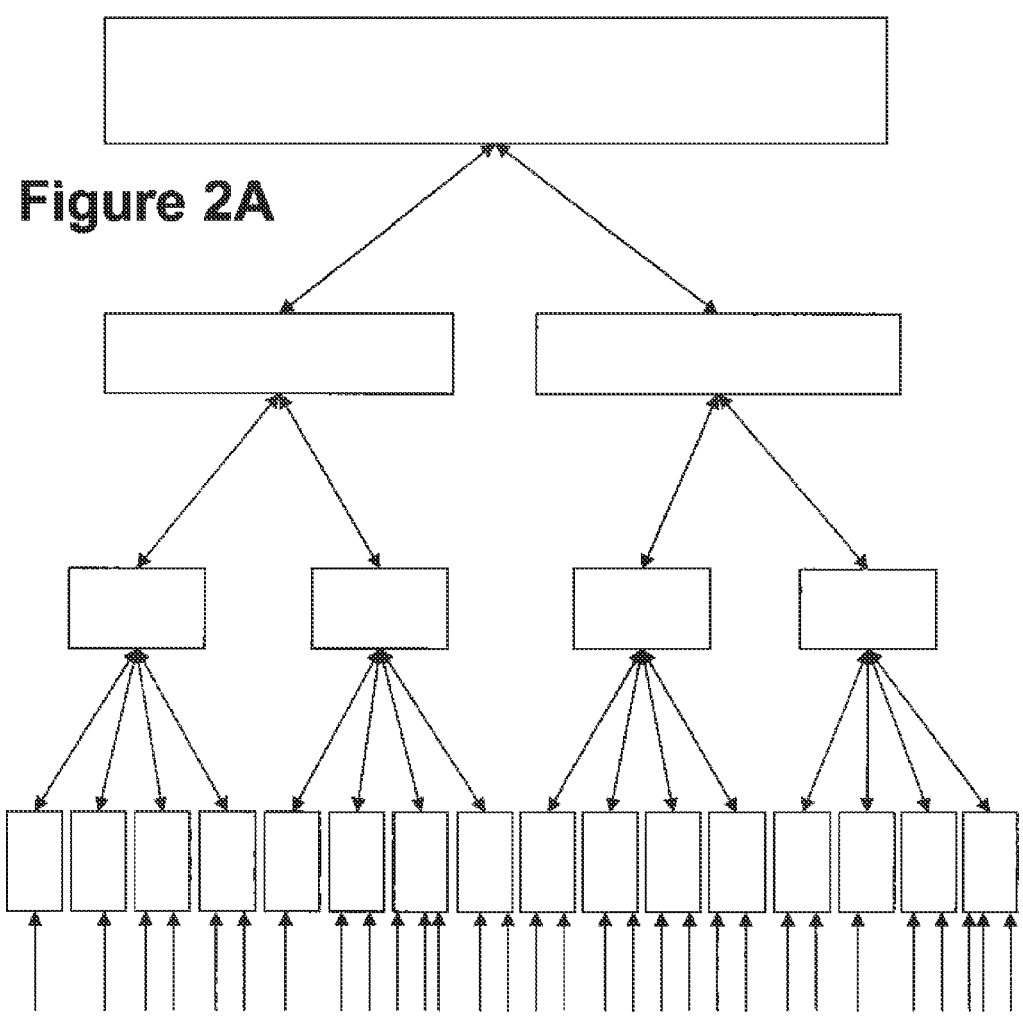
FIG. 2A illustrates a revised hierarchical diagram for the human visual processing system of FIG. 1.

Combining the information in the previous paragraphs leads one to revise the simple hierarchy of FIG. 1 into an ascending hierarchy of cortical processing units wherein each cortical processing unit inputs and outputs sequences of patterns. FIG. 2A illustrates a block diagram one embodiment of a revised hierarchical diagram for the human visual processing system wherein each rectangular block represents a cortical processing unit. As set forth earlier, the hierarchical organization may not always consist of progressively fewer cortical processing units on each ascending layer. For example, FIG. 2B illustrates an embodiment of a cortical processing unit hierarchy wherein the third layer from the bottom has more cortical processing units than the second layer from the bottom.

FIG. 2A illustrates a very simplified version of the proposed hierarchical architecture of the visual processing portion of the human neocortex concerned with recognizing forms and identifying objects. In the illustration of FIG. 2A, each layer of the hierarchy comprises one or more cortical processing units wherein each cortical processing unit is represented by a rectangular box. Note that FIG. 2A is just provided for conceptual explanation purposes. In reality, there are certainly many more layers and there are certainly many more processing units on each layer. With the proper determination of the single cortical algorithm that drives each processing unit, an intelligent machine may be constructed using the hierarchical architecture illustrated in FIG. 2A in order to perform visual object recognition.

The Cortical Algorithm Stores Structure in Memory for Later Recognition

Referring to FIG. 2A, we know that the sensory input information received at the bottom of the hierarchy consists of sequences of patterns from the sensory organs. Following the presumption that there is a single 'cortical algorithm' that is used throughout the brain then each cortical algorithm processing unit would likely also output patterns (that, over time, are sequences of patterns) such that those patterns may be used as the inputs for the next higher layer of cortical processing units in the hierarchy. Thus, the challenge is to determine what algorithm is used internally in each cortical processing unit to process the incoming sequence of patterns and generate an outgoing sequence of patterns.

It is well known that the brain has a large distributed memory system. Following the single cortical algorithm model, then each cortical processing must include memory for storing information. Since each cortical processing unit receives an input sequence of patterns, has a memory, and outputs information; then that memory must be used by the cortical processing unit to help process the input sequence of patterns in order to create the output sequence of patterns.

One of the great mysteries of the human brain is how it creates invariant representations of objects in the world. An invariant representation is an internal representation of an object (a physical object, a word, a song, etc.) in the brain that allows the brain to later recognize the same object in just about any different external condition. For example, a brain's invariant representation of a particular person allows the brain to later identify that person in any lighting condition, from any viewing angle, and from any distance provided that there is enough information in the sensory input stream to identify that person.

The system of the present invention proposes that an invariant representation of an object can be constructed by using a hierarchy of cortical processing units. The invariant representation is formed by identifying invariant structure within the constantly changing sequence of patterns and storing that invariant structure so that it may later be recognized. Every cortical processing unit performs this process of identifying, storing, and later recognizing invariant structure at every level in the hierarchy. Thus, the overall invariant representation of an object comprises all of the invariant structures associated with that object that have been stored in a set of hierarchically arranged cortical processing units. Note that an invariant representation includes invariant structures at many different levels. All of these different levels invariant structures (including the entire invariant representation structure) can be used within the invariant representations of other objects.

The neocortex must create these invariant representations of objects using the neocortex's only source of outside information, the constantly changing sequence of patterns from the various sensory organs. Thus, the neocortex must create an invariant representation of an object by identifying invariant structures within the constantly changing sequence of patterns. The memory in each cortical processing unit must be used to store invariant structure that has been located in the incoming sequences of patterns. In this manner, the stored invariant structures may later be recognized in the incoming sequence of patterns in order to recognize objects that include that invariant structure.

But what exactly is an invariant structure in a sequence of patterns? A non-structured sequence of patterns is generally represented as a completely random stream of patterns. So a structured stream of patterns is not a random stream of patterns. But how can a cortical processing unit that has not had any learning identify a sequence of patterns that is not random? One possible method is to have the cortical processing unit look for a repeated patterns or repeated sequences of patterns. Repeated patterns and repeated sequences of patterns are unlikely to be random noise. Furthermore, the more times that a pattern or sequence of patterns repeats, the less likely that the repeated pattern or the repeated sequence of patterns is random. Thus, repeated patterns and repeated sequences of patterns are likely to be part of an invariant structure. A number of other methods may also be used to identify invariant structures with the stream of patterns. For example, ordered progressive pattern changes such as 1, 2, 3, 4, and so on are also mostly likely to be invariant structure.

In one embodiment, each cortical processing unit may search for repeated patterns or repeated sequences of patterns in the input stream in order to identify invariant structures contained within the input stream. The cortical processing unit may then store those repeated patterns and repeated sequences of patterns in memory for later recognition.

In order to limit the amount of memory used, a cortical processing unit may only memorize the most frequently repeated patterns or sequences of patterns. This limited number of repeated patterns or sequences of patterns stored in memory may be considered as a set of 'categories' that are used to classify incoming patterns or sequences of patterns. Later, when a previously seen and memorized pattern or sequences of pattern (a learned invariant structure) is encountered again, the cortical processing unit can inform the next higher cortical layer about the identified invariant structure found in the input stream.

Upon recognition, a cortical processing unit may pass up a sequence identifier (or name) for the recognized sequence of patterns to the next higher layer in the hierarchy. As long as the incoming sequence of patterns continues to match the memorized sequence of patterns, the cortical processing unit will continue to output the same sequence identifier for that recognized sequence of patterns. Since the same sequence identifier is being output during the entire pattern sequence, one can see that higher layers will have processing units that switch less frequently than lower processing units.

Note that if a cortical processing unit fails to recognize a pattern or sequence of patterns, the cortical processing unit may output an identifier to the cortical processing unit in the next higher layer that indicates that nothing was recognized in the current input stream. Alternatively, the cortical processing unit may output an identifier that indicates that there was an error between a predicted pattern and the actual pattern received.

The sequence identifier itself is a pattern on the cortical processing unit's output. And the output pattern (the sequence identifier) becomes the input to the next higher cortical processing unit. Over time, a cortical processing unit will output different sequence identifiers as different sequences are recognized such that a sequence of patterns (a sequence of sequence identifiers) is output from the cortical processing unit.

The cortical processing unit in that next higher layer can then apply the same cortical algorithm to its input stream(s) from one or more processing units in lower layers of the hierarchy. Specifically, the cortical processing unit in that next higher layer can examine the input stream for repeated patterns or sequences of patterns and store those repeated patterns and/or repeated sequences of patterns. When the cortical processing unit recognizes a stored sequence of patterns in the input stream, that cortical processing unit can inform a cortical processing unit in the next higher layer with a sequence identifier for the recognized sequence. In this manner, the hierarchy of cortical processing units (as illustrated in FIG. 2A) is able to identify structures within structures.

With a large number of individual cortical processing units organized in a hierarchical manner, very complex invariant structures may be memorized and later recognized. The collective memory of invariant structures learned by the hierarchy of cortical processing units comprises a model of the surrounding world.

The hierarchical structure promotes efficient usage of memory since simple structures in lower hierarchical layers can be combined in many different manners to create more complex structures in higher layers. For example, low level cortical processing units may recognize simple invariant structures such as lines of different orientations (vertical, horizontal, 45 degree, etc.). Then higher level cortical processing units may recognize more complex structures by combining together different permutations of the line orientations in the lower-level structures. For example, a higher level cortical processing unit may recognize a rectangle as a first pair of parallel lines that are coupled at each end by a second pair of parallel lines with an orientation that is orthogonal to the first pair of lines. A square could be recognized as first pair of parallel lines that are coupled at each end by a second pair of parallel lines having an orientation that is orthogonal to the first pair of lines and a length equal to the first pair of parallel lines. Note that the same low level structures are used in both higher level object definitions. The rectangle structure itself may be primitive structure used to identify more complex objects such as a house, a billboard, a television, etc.

As one proceeds up the hierarchy of cortical processing units illustrated in FIG. 2A, the cortical processing units in each successive layer become more stable since the identified sequence of patterns will change less frequently. Eventually, at a high level, the information becomes very stable. For example, in a high layer such as IT region in the human neocortex's system for identifying visual objects, a consistent visual pattern such as a human face can be consistently recognized even when it moves about the person's field of view thus creating very different visual input information that causes rapid switching in lower regions such as the V1 region. Specifically, studies have shown that certain cells in the high levels such as the IT region remain activated as long as there is a human face within the field of view even when the face moves about the field of view.

The Cortical Algorithm Makes Predictions Using its Stored Memories

A core theory about the nature of intelligence set forth by this document is that intelligence is measured by the ability to make useful predictions. Intelligence allows humans (and other mammals) to use accumulated knowledge about the world in order to make predictions about the world. Simply identifying invariant structure in the surrounding world alone is not very useful. However, using that accumulated knowledge about the world in order to make accurate predictions about that world is a very useful adaptation for an animal struggling to survive in the world. When an entity can make accurate predictions about an object or situation, then that entity has intelligence such that the entity can be said to 'understand' that object or situation.

An animal that is able to identify a previously encountered situation and then make accurate predictions about that situation will be better able to survive and reproduce. For example, a gazelle that previously encountered a lion catching and eating another gazelle may learn from that encounter such that it can predict that hanging around lions may get oneself killed. Based upon that prediction, the gazelle may opt for behaving in a manner that prevents the undesirable prediction from coming true . . . Run! Similarly, an animal with the ability to predict may adapt its behavior to cause favorable predictions to come true. If an animal previously encountered a watering hole by the patch of five trees, then the animal may predict that going to those five trees would again provide a watering hole. Therefore, natural selection favored animals with a neocortex well suited for making accurate predictions.

As set forth in the earlier sections, the neocortex likely uses a single cortical algorithm in all the cortical processing units arranged in a hierarchy to address many different problems. Thus, both high level cortical processing units and low level cortical processing units make predictions. Very high level cortical processing units may make sophisticated decisions such as those presented in the previous paragraph that helped an animal survive. However, even very low level cortical processing units constantly make very simple predictions. A person's neocortex constantly makes many of these low level predictions without that person being aware of those predictions. Those low level predictions are generally only of interest to the surrounding low level cortical processing units. (But even low level predictions may escalate up the hierarchy if the prediction does not match a sensed reality.)

For example, if you are sitting in a chair then the low level cortical processing units coupled to your sense of touch predict that pressure will continue to be felt by your body in contact with the chair as long as you remain in that chair. This prediction is constantly made but is generally of interest only to other low level cortical processing units such that you are not even aware of the pressure against your body unless you make a conscious effort to detect it. As long as the incoming reality matches with the prediction, there is understanding of the situation. (In this case, the understanding is at a very low level.)

When a prediction fails to match sensed input, there is confusion such that information about the failed prediction moves up the hierarchy for additional consideration. Thus, if the chair you are sitting on suddenly breaks causing you to drop then the low level cortical processing units that were predicting continued pressure from body contact will now signal a failed prediction. The nearby higher cortical processing units will not be able to resolve these failed predictions such that the failed prediction rapidly escalates far up the cortical processing unit hierarchy such that you become aware that you are falling. Thus, many predictions are constantly being made at various low levels outside of our consciousness. However, even a failed low level prediction may escalate up the hierarchy such that we become aware of the problem if no cortical processing unit in the hierarchy is able to resolve the failed prediction.

One of the most common examples of failed low level prediction that escalates into our consciousness that almost everyone has experienced is that sudden feeling of panic that you feel when you are walking up stairs and your foot passes through the plane where you predicted the next step should be. Your brain notes that reality does match the prediction such that the problem rapidly escalates up the cortical hierarchy. Since no intermediate cortical processing unit is able to resolve this failed prediction, the failed prediction escalates all the way up into your consciousness in order to bring your attention to the problem.

Our brain can adjust to mismatches between sensory input and predicted reality in many different ways. If the sensory perception is deemed to be accurate but the prediction is not then the error indicates that the brain's model of the world is not accurate. The brain may adjust its model of reality by learning. Thus, in the preceding example, you may learn that the set of stairs has fewer steps than you previously expected.

Assuming that cortical processing units make predictions then one must determine how these cortical processing units in the neocortex can make these predictions. As set forth in the previous section, each cortical processing unit stores sequences of patterns in memory (Ideally, sequences of pattern that represent structure in the world) for later recognition. If the incoming patterns match a particular memorized sequence, then the cortical processing unit 'recognizes' that particular sequence and informs the coupled processing units in higher layers that a known sequence is being observed. However, this sequence recognition can also be used to make a prediction. Specifically, if a cortical processing unit recognizes that it is currently in a known sequence of patterns, then that cortical processing unit may determine the next pattern that the processing unit expects to receive by identifying the next pattern in the recognized sequence of patterns. This next expected pattern constitutes a prediction by the cortical processing unit. Such predictions occur all the time in our brains at every level of the cortical processing unit hierarchy.

Figure 2C:
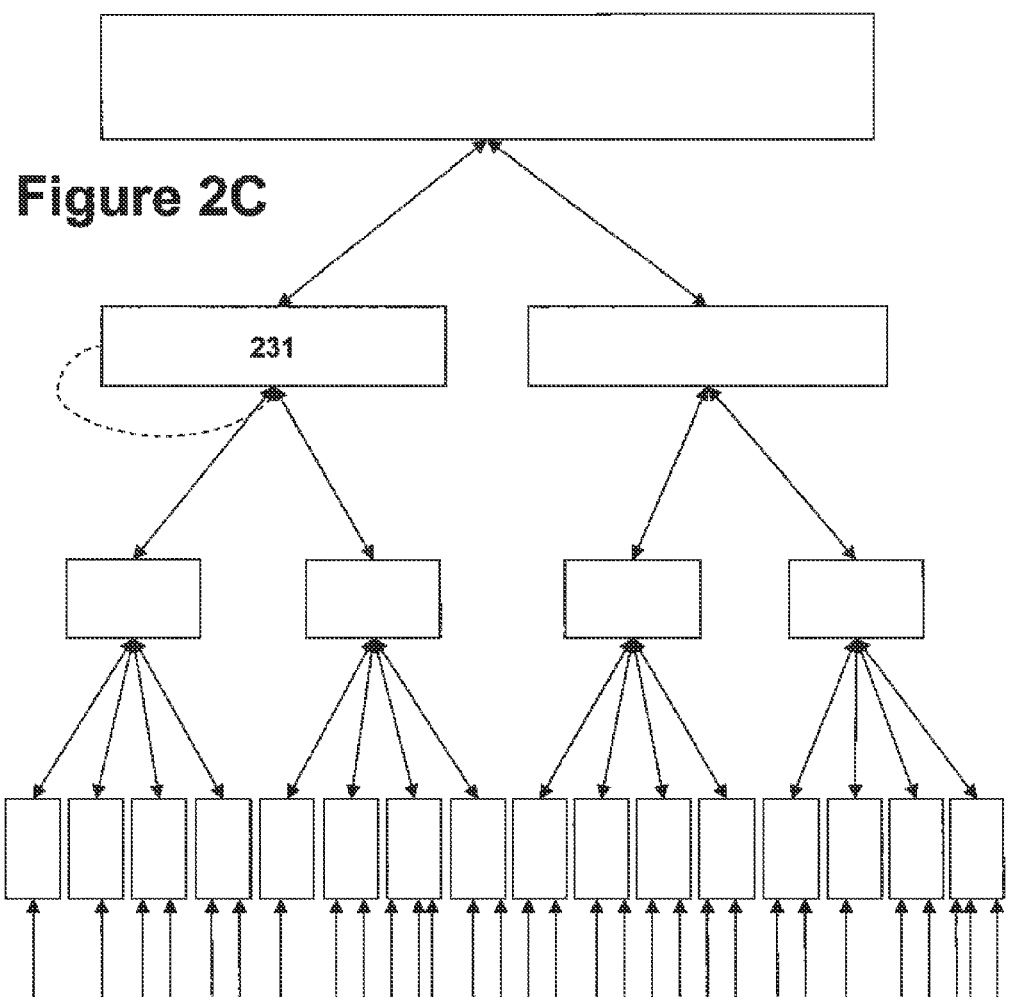
FIG. 2C illustrates the alternate hierarchical diagram of FIG. 2A with a local prediction feedback.

The next pattern prediction made by a cortical processing unit may be used as an input to that processing unit to be processed. For example, FIG. 2C illustrates the cortical hierarchy of FIG. 2A wherein cortical processing unit 231 has made a prediction of the next expected pattern (represented by the dashed line) and that prediction that is passed back into cortical processing unit 231 as input information. There are various different ways of accomplishing this result. In one embodiment, the predicted pattern value may be delayed before being introduced into the input stream. In the book "On Intelligence", it was suggested that the thalamus may be used to perform this function in the human brain.

There are a number of uses for such predictions. One simple example is that the cortical processing unit may compare its prediction of the next pattern to be received from lower processing units with the actual pattern received. In such a manner, the cortical processing unit may be able to use the pattern prediction to resolve ambiguous information. For example, if the next pattern is very close to the expected pattern, then the cortical processing unit may deem that the next pattern was really meant to be the predicted pattern but it may have been distorted by noise. If the cortical unit presumes that the predicted pattern was really what was meant, then the cortical processing unit will deem that it is still within the recognized sequence. Thus, a pattern sequence that is very similar to a predicted pattern sequence may effectively be changed into that predicted sequence. Thus, a cortical processing unit may create a perceived reality by combining an actual real but ambiguous input (a closely matching pattern) with a known model of reality (the expected pattern) to create a perception of reality. If the expected pattern is significantly different than the expected pattern, then the cortical unit may try to recognize a different known sequence of patterns, signal an error to higher units, signal the error to lower units, or act in another manner.

One should note that this use of prediction information to resolve ambiguous input information is similar to the operation of existing auto-associative memories. An auto-associative memory is a memory that produces a full clean version of known pattern or sequence of patterns when give a noisy or partial version of that known pattern or sequence of patterns. Thus, in an auto-associative memory, a group of similar input patterns or sequences of patterns will all retrieve and output the same output pattern or sequence of patterns. This is a form of generalization that humans can do effortlessly. However, most auto-associative memory systems will fail if the input pattern is shifted, rotated, scaled, or otherwise distorted in a significant manner.

Human memories are often linked together by their own content like auto associative memories. For example, if you wish to recall information about a house that you lived in long ago, you may wish to view a photograph of that house to 'prime' your memory (the photograph being a partial input of the full house memory). Upon seeing the photograph of the house, a flood of memories about that house (the full clean version of the house memory) may be produced. Thus, memories of the house were addressed using the house itself, hence the term auto-associative memory.

Auto-associative memories can be used to store sequences of patterns. To store a sequence of patterns in an auto-associative memory, one can associate the current input pattern with the previous input pattern, then associate the next input pattern with the current input pattern, and so on. Then, the output of the auto-associative memory is coupled to the input of the auto-associative memory. In this manner, when the auto-associative memory is primed with a spatial pattern that is associated with the first pattern in the sequence, the entire sequence will be recalled.

Auto-associative memories may be used to construct primitive versions of the cortical hierarchy of the present invention. For example, auto-associative memory devices may be arranged in a hierarchical arrangement wherein the outputs from low-level auto associative memories are coupled to the inputs of higher auto-associative memories with some additional circuitry. In such a system, the auto-associative memories store, recognize, and recall the pattern sequences mentioned earlier. The additional circuitry is needed to transform the output sequences into names of output sequences that will be provided to the next higher level of auto-associative memories.

Referring back to next pattern prediction made by a cortical processing unit, the next pattern prediction may also be passed between different cortical processing units. FIG. 2A illustrates the different hierarchical layers with information flowing both upwards and information flowing downwards. As set forth earlier, each individual cortical processing unit attempts to identify invariant structure in its input stream. When a processing unit recognizes a memorized sequence of pattern, information about that recognition (an identifier for the recognized sequence) is passed upward to the next higher cortical unit layer(s). Furthermore, information about failed predictions may flow upward. The downward information flow may include next pattern predictions made by higher cortical processing units in the hierarchy to lower higher cortical processing units.

Figure 2D:
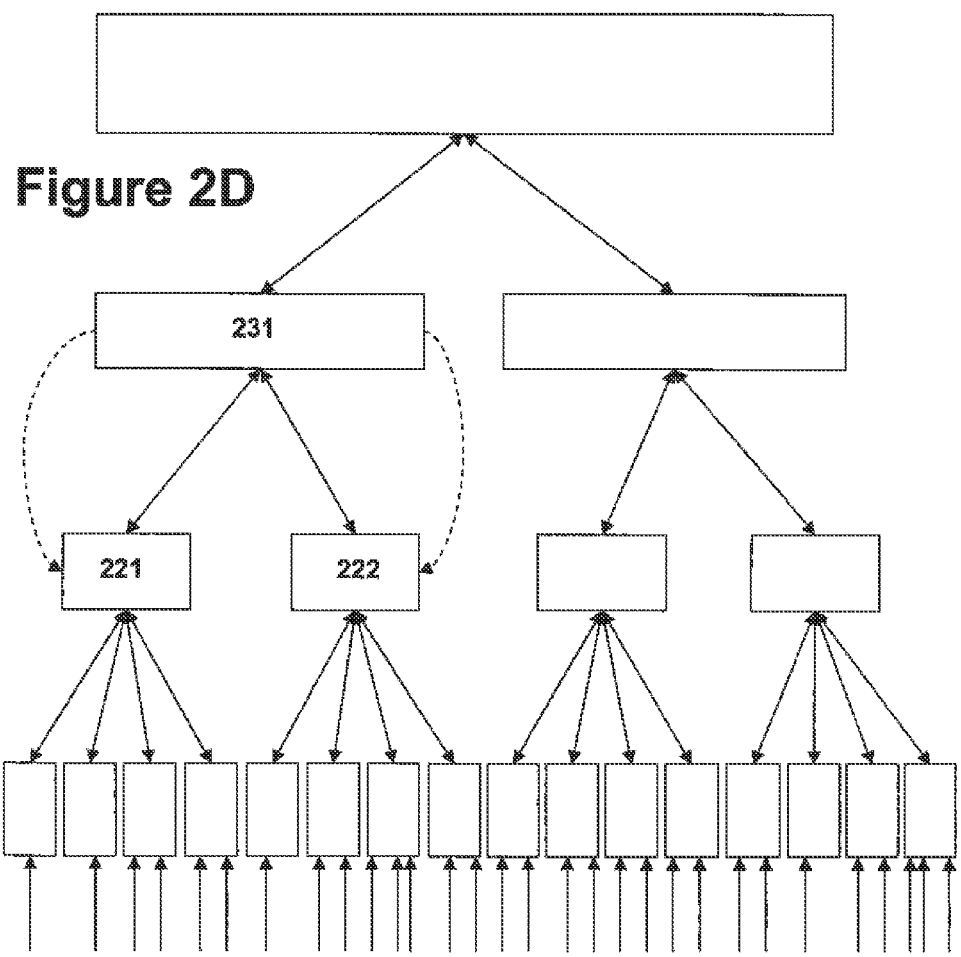
FIG. 2D illustrates the alternate hierarchical diagram of FIG. 2A with a prediction passed from a higher layer to a lower layer.

FIG. 2D explicitly illustrates a conceptual example of such a downward flow of prediction information. Specifically, cortical processing unit 231 has made a prediction (represented by a dashed line) that is passed to the two cortical processing units (221 and 222) in a lower cortical layer that are coupled to cortical processing unit 231.

Each cortical processing unit memorizes sequences of patterns that the cortical processing unit receives on its input. Those inputs are actually identifiers of recognized sequences from the cortical processing units in the lower layer. When an upper cortical processing unit recognizes that it is currently within a memorized sequence of patterns then the cortical processing unit may predict the next pattern in the sequence it is currently receiving. If that predicted pattern is passed to the cortical processing unit in the hierarchical layer below, that predicted pattern represents the next sequence of patterns that is expected from the lower cortical processing unit. Thus, the lower cortical processing unit receives a prediction about the next expected sequence of patterns it will likely encounter.

Such a prediction about the next expected sequence may help a cortical processing unit resolve ambiguity on a sequence of patterns level. A cortical processing unit may not be able to match a new incoming sequence of patterns to any of the stored sequences of patterns. Or worse, the incoming sequence of patterns may closely resemble two different stored sequences of patterns. To determine how to properly categorize such an ambiguous current incoming sequence of patterns, the cortical processing unit may consider the prediction information received from a higher cortical processing unit. Thus, if a cortical processing unit cannot determine if a current sequence of patterns matches memorized sequence A or memorized sequence B and the higher level cortical processing unit predicts that it will receive sequence B, then the cortical processing unit may use that prediction from the higher cortical processing unit to resolve such ambiguous cases and thus select sequence B.

This complex prediction system that creates predictions both within individual cortical processing units and between coupled cortical processing units creates a sophisticated prediction system that operates throughout the entire hierarchy in a coordinated manner. Specifically, every cortical processing unit in the hierarchy may use its own memory to predict the next pattern to be received in the currently recognized sequence of patterns. And every cortical processing unit in the hierarchy may pass that predicted next pattern down to the lower connected cortical processing units. A cortical processing unit may use a prediction received from a higher cortical processing unit to predict the next sequence of patterns that will be received.

As long as each pattern or pattern sequence prediction matches the received input, things run smoothly. And predictions may be used to resolve ambiguous patterns or pattern sequences. But when a prediction is significantly wrong, an error signal or the unexpected input is propagated up the cortical hierarchy. If a cortical processing unit higher up in the hierarchy is able to resolve the problem, then correction information will flow from that cortical processing unit back down the hierarchy. If a problem propagates all the way to the 'top' of a hierarchy, then some new learning may need to occur in order to address the novel situation in the future.

As set forth in an earlier section of this document, the collective memory of invariant structures learned by the hierarchy of cortical processing units comprises an invariant representative model of the surrounding world. By combining incoming sequences of patterns from sensory organs along with sequence and pattern predictions that are constantly made by all the cortical processing units using the invariant representative model of the surrounding world stored in the memory, our neocortex generates a full perception of reality. Thus, our understanding of 'reality' is more than simply what we can detect with our senses at any particular moment. Instead, our perception of reality is created with both sensed information (from our sensory organs) and information recalled from memory (our model of the world). (In fact, the majority of our perception of reality may come from memory.)

This combination of sensed information with memorized information is very useful since our individual sensory organs alone do not provide enough information to completely understand the surrounding world. Only the combination of sensory information with information recalled from memory such that accurate predictions can be made leads to a real understanding of the surrounding world. The more invariant structure that has been deduced from the surrounding world and stored into memory, the more accurate predictions can be made about that surrounding world. And consequently, the more accurate predictions can be made about that surrounding world, the better understanding of the outside world.

There are numerous examples that illustrate how our neocortex combines sensory input with our model of the world in memory to create a full perception of reality. For example, it is well known that people do not always hear every word that is spoken by another person in a typical conversation. However, our ability to predict the proper word that would be appropriate at the time of an unheard word allows us to understand what the other person said without hearing every word. This only occurs when a person is sufficiently fluent in a language. Before becoming fluent, a person learning a language will often need a speaker to slow his rate of speaking and annunciate every word. A similar type of prediction occurs when reading difficult to read handwriting. Specifically, our learned knowledge of sentence structure, grammar, the material being discussed, and other memorized information allow us to decipher handwritten words that could not be deciphered if presented alone.

A very interesting example of combining sensory information with memorized information occurs with the blind spot in our eyes. Our eyes have a 'blind spot' where the optic nerve couples the rear of the eyeball. The blind spot exists because there are no light detecting cells on the retina where the optic couples to the eyeball. This blind spot only fully exists when one eye is closed since normally the other eye covers the field of vision containing the eye's blind spot. But even when a person has only one eye open, that person does not notice a gaping hole in his visual field. In fact, a person must make a concerted effort to even become aware the blind spot when looking with only one eye. How can this be possible?

The reason that the blind spot is not easy to detect is that our brain combines the sensed visual information with predicted visual information such that the hole from the blind spot is 'filled in' to create the full visual perception. Specifically, the brain fills in the hole with information from the surrounding visual scene and makes intelligent predictions to fill in the hole. If the blind spot hole is within the pattern of a carpet, then that carpet pattern will be used to fill the hole. If a straight line passes through the blind spot, then a straight line segment will be filled into the blind spot in order to complete the straight line. Since our brains are very good at making predictions about our surroundings due to years of learning, the predicted information appears to be just as real as the actual sensed information. Thus, you really cannot always believe what you "see".

Cortical Algorithm Makes Predictions from Invariant Representations and Input Data Feedback or information flowing down the cortical hierarchy serves a number of functions. As set forth earlier, the feedback information can be used to resolve ambiguous input data. But the feedback data is also used for other very important functions.

The feedback information may be required for learning. As every cortical processing unit and region of neocortex learns sequences of patterns, that cortical processing unit or region of neocortex learns the sequences in a particular context that is provided by the next higher cortical processing unit or region of neocortex. The context specifies a state of the higher cortical processing unit or region of neocortex. The context may be specified as the current element of a sequence being experienced by that higher cortical processing unit or region of neocortex. This context feedback information provides a means for the cortical processing unit or region of neocortex to properly group its input patterns together.

Another very important use of feedback information from higher layers is to provide the ability to perform specific predictions using invariant representations. Predictions based on invariant representations occur when a high level pattern moves down the hierarchy towards the input. Such predictions occur in two different manners. A first manner occurs when the system predicts something that has not yet happened. For example, our neocortex allows us to predict (and hear) the next note of a song before it has happened. The other invariant representation type of prediction occurs when a system fills in missing information in something that is happening now. For example, our neocortex fills in missing or occluded parts of a visual image as previously described with reference to the blind spot.

In both of these scenarios the system has a challenge in making the desired specific prediction. The challenge presented is that a pattern high up in the cortical hierarchy is in an invariant form. The invariant form lacks the details to generate a prediction that is precise and relevant to the current situation. But ideally, the system should generate as precise of a prediction as is possible. Thus, the invariant representations must be combined with some specific feed forward information to make specific predictions.

A couple of examples will illustrate the concept. Imagine that you are expecting to see a dog (perhaps you heard a dog bark). In the high-level IT region in the neocortex's visual processing region, the neocortex knows that it should be representing "dog". However, without any additional current information, the IT region of neocortex cannot predict what type of dog you will see, where the dog will be, and in what position the dog will be seen. However, if you are already seeing part of a dog (such as a foot or tail), the neocortex can use this partial feed forward information to help predict where the rest of the dog will be and what the dog will look like. Similarly if you are expecting to hear a particular note interval in a song, such as an octave step up, there is no way to determine what will be the precise next note without additional information. However, if your neocortex is able to combine this "invariant" octave step up prediction along with the last note that was heard then the neocortex will be able to precisely predict the next note that will be heard.

As set forth above, invariant representations must be combined with some feed forward information in order to generate specific predictions. The general method to do this is as follows. As feed forward inputs arrive at a cortical processing unit or a region in a memory hierarchy from the units below, those feed forward inputs may be combined to form a spatial pattern. As part of the learning process, this spatial pattern must be stored as one type of example of whatever higher level context information is being fed down to this cortical processing unit or region. As different feed forward inputs (combined into spatial patterns) arrive, the feed forward inputs (spatial patterns) are stored as part of different higher-level contexts that are provided at that time. For example, a cortical unit or neocortex region may experience the following learning: pattern A (feed forward input pattern) is a dog (context), pattern B is a dog, pattern C is a cat and pattern D is a cat. Those A, B, C, and D patterns are the components of invariant representations that are learned for future reference.

The stored patterns are later used during recognition. For example, when feedback information to a cortical unit or neocortex region specifies an expectation of seeing a dog, then the cortical units or neocortex region partially invokes all the stored patterns that were stored in the context of "dog". In the example from the previous paragraph, the cortical units or neocortex region will partially invoke patterns A and B since those patterns were stored in the context of "dog". To complete the prediction process, the partially invoked invariant representation must be combined with current information. Thus, partial feed forward input to the cortical units or neocortex region will preferentially match pattern A or pattern B such that the combination of the feed forward input and its matching pattern results in a precise prediction. The prediction is a specific prediction (pattern A or pattern B) created by combining the feed forward input to the known examples of the "dog" context.

The book "On Intelligence" sets forth the details of one mechanism that may be used within the human neocortex. This mechanism uses sparse distributed spatial patterns. In the described mechanism, layer 2 cells in the six layer columns of neocortex are a superset of all relevant invariant representation patterns. Feedback information from above activates an invariant representation in layer 2 and the activated layer 2 cells signal layer 6 cells in the same column. Feed forward input information from below representing the current situation is provided to layer 6 of the columns relevant to the feed forward information. The intersection of feedback created layer 2 cell activity that signals layer 6 and feed forward activity in layer 6 determines the specific prediction.

There are many other methods of performing the same function in other systems. The requirements of constructing a system are relatively simple. First, the system must have multiple different representations of multiple different objects (the different contexts). Each of the multiple different representations must be associated with a specific type of feed forward (or input) information such that the feed forward information will partially activate the representation. Feed back information that specifies a particular context (object) must be able to partially activate the different representations associated with that context (object). Any representation that is partially activated by feedback information and partially activated by feed forward information is considered fully activated. In such a system, a specific prediction can be made by specifying a particular context with feedback information (to partially activate a relevant set of representations) and specifying current feed forward input information (to partially activate representations related to the feed forward information) such that a fully activated representation is generated as a prediction. The prediction may then flow down the hierarchy.

Initially, this may seem to be a very impractical method of operation since there are a nearly infinite number of possible ways objects can appear (different representations). If one attempted to store a different pattern representing each possible input, this would require an impossibly large amount of memory. But as set forth in the previous sections, a hierarchical memory organization is very efficient at representing very large numbers of different things such that this apparent limitation can be overcome. In essence the lower regions of the memory hierarchy form representations of lower level primitives that are shared among many higher-level object representations. This dramatically reduces the amount of memory required to represent a very large number of different items.

An Intelligent Machine Architecture

To construct a sophisticated memory systems or an intelligent machine, the present invention proposes using aspects of the architecture and the operation theory of the human brain set forth in the previous sections as a blueprint for creating sophisticated memory systems and intelligent machines. By attempting to emulate important aspects deduced from the sophisticated intelligence system honed by evolution (the human neocortex), significant advances in the field of artificial intelligence may be achieved. This approach avoids the pitfalls of the current main two approaches of artificial intelligence.

The subsections of the previous section set forth the main principles that have been derived from the mammal neocortex. Specifically:

1. Sensory Input Comprises Sequences of Patterns
2. The Neocortex Uses a Single 'Cortical Algorithm' for many different problems
3. The Neocortex Is Organized in a Hierarchical manner
4. The Cortical Algorithm Stores Structure in Memory for Later Recognition
5. The Cortical Algorithm Makes Predictions Using Its Stored Memories
6. Cortical Algorithm Makes Predictions from Invariant Representations and Input Data Using these six principles, various different sophisticated memory systems and ultimately an intelligent machine may be constructed. Not all of these different principles must be used in every embodiment that uses the teachings of the present invention. Many useful systems may be created by combining together only a few of these teachings.

An intelligent system may comprise a plurality of individual cortical processing units arranged into a hierarchical structure. Each individual cortical processing unit receives a sequence of patterns as input. Each cortical processing unit processes the received input sequence of patterns and outputs another pattern. As several input sequences are processed by a cortical processing unit, it will generate a processed sequence of patterns on its output that will be passed to cortical processing units in higher layers.

Each individual cortical processing unit includes a memory that is used to help process the input sequence of patterns. The memory may comprise previously encountered sequences of patterns that contain invariant structure. An input sequence of patterns may be deemed to contain structure if that sequence of patterns is repeated. An individual cortical processing unit can use the stored sequences of patterns in order to 'recognize' such sequences in the input stream.

When a previously encountered sequence of patterns is recognized by a cortical processing unit, the cortical processing unit can report such recognition to higher layer cortical processing units. The output to the higher layer may comprise an identifier of the recognized sequence of patterns in the incoming sequence of patterns. The output stream containing identifiers of recognized sequences comprises a sequence of patterns itself. That output stream of patterns may comprise the input to a cortical processing unit in the next higher cortical processing unit layer.

A cortical processing unit may also use the memorized sequence of patterns in order to make predictions about the incoming sequences in order to resolve ambiguous information. Specifically, when a cortical processing unit determines that it is currently receiving a known sequence, the cortical processing unit may predict the next pattern to be received in the sequence. The processing unit may use the prediction to interpret the next pattern received. For example, if the input stream into a cortical processing unit is ambiguous, then that cortical processing unit may use the predicted pattern to help identify the next input pattern.

The cortical processing unit may further provide the predicted next pattern down to the next lower cortical processing units. The lower cortical processing units may interpret this as a prediction of the next sequence that it will output. Such prediction information may comprise information that helps the lower cortical processing unit layers correctly identify the next sequence.

The prediction information may also be considered as useful predictions of what will occur in the outside world. And if an incoming pattern significantly differs from a predicted pattern or an incoming sequence of patterns significantly differs from the predicted sequence of patterns, then there is a prediction failure. The occurrence of a prediction failure may be transmitted to a cortical processing unit in a higher layer. A cortical processing unit in a higher layer may be able to resolve the error. A detected error may be resolved in a number of different ways. One way to resolve the error is to adjust the cortical hierarchy's model of the world by storing a new sequence of patterns.

One Visual Pattern Recognition Implementation

The previous sections have described a system that has a hierarchy that stores sequences and makes predictions of future events. However, like the human visual system, the system can be used to solve spatial recognition problems. This section presents one example embodiment of a prototype program that uses the teachings of the previous sections to recognize visual object patterns by first learning about the object patterns. As one skilled in the art of computer knows, there are many different ways to implement the methods and architecture presented in the previous sections of this document. However, the principles of operation and the architecture are set forth with sufficient detail such that many different systems that incorporate the teachings of this document may be created.

The prototype pattern recognition program is constructed of a hierarchy of cortical processing units that analyzes input training information consisting of line drawings in order to identify structures within that training information. The prototype program is also informed about the names of objects in some of the training information such that the prototype program can associate particular learned structures with particular object names. After the prototype program completes its learning phase, the prototype program can then accurately recognize objects in novel input data using the learned information.

In this example prototype pattern recognition program, the hierarchical processing units of the prototype program receive pattern information that is presented as a continuous stream in the form of animated movies. Thus, sequences of patterns are presented to and learned by the prototype program. The prototype program then uses the learned information to create probabilistic models about the outside world. The probabilistic models are then used to recognize objects in novel pattern data using Bayesian belief propagation as is well-known in the art. Explicit details on Bayesian belief propagation can be found in the book "Probabilistic Reasoning in Intelligent Systems: Networks of Plausible Inference" by Judea Pearl" from Morgan Kaufman Publishers, Inc. However, other implementations that incorporate the teachings of the present invention may process the learned information in different manners and may use other methods of inferring a final result.

The Visual Pattern Recognition Problem Addressed

The visual pattern recognition problem addressed by the prototype program implements the hierarchical architecture of the present invention with computer software. To keep the size of the software, the amount of memory required, and processing requirements of the prototype program under control and to quickly create a functioning prototype, some simplifications were made from an ideal implementation of the present invention.

Figure 3A:
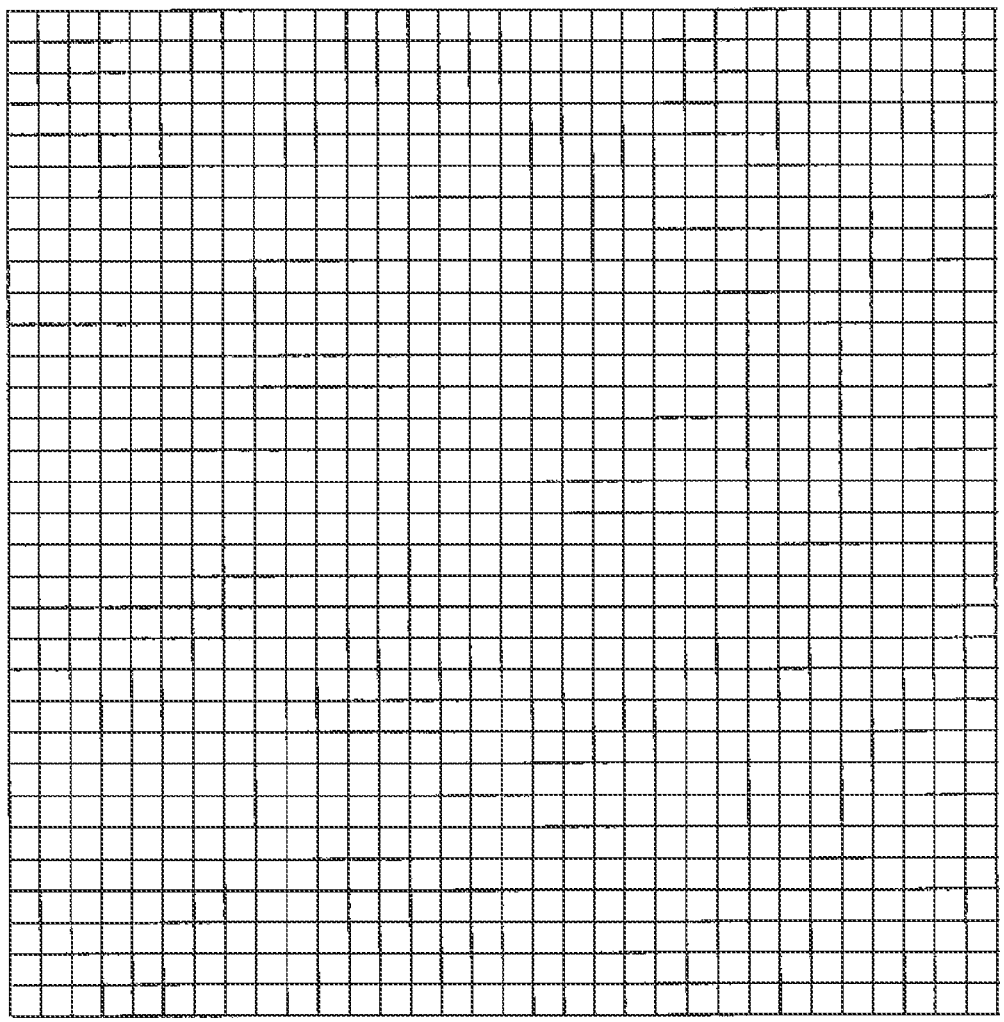
FIG. 3A illustrates a grid of pixels in the limited visual world considered by a prototype program machine intelligence program.

Furthermore, the visual pattern world of the prototype program was limited to a small pixel grid. Specifically, FIG. 3A illustrates the thirty-two by thirty-two grid of black or white pixels that make up the limited visual world of the prototype program. However, the thirty-two by thirty-two grid of black or white pixels presents ample room to create a variety of line drawings and closely related versions of those line drawings that should be identified as belonging to the same group. Examples of some of the line drawings created in the thirty-two by thirty-two black and white pixel grid are presented in FIG. 8.

The Sensory Input Used for the Visual Pattern Recognition Problem

The hierarchical arrangement of cortical processing units in the prototype program analyzes the entire thirty-two by thirty-two grid of pixels first during a learning phase and then later during a pattern recognition phase. In an example embodiment of the prototype program, the lowest level of cortical processing units each process an input sequence of patterns from a four by four patch of pixels. FIG. 3B illustrates the thirty-two by thirty-two grid of pixels divided into a set of four by four patches of pixels. Each individual four by four patch of pixels is analyzed by its own first level cortical processing unit. There are sixty-four individual four by four pixel patches illustrated in FIG. 3B such that the first cortical processing unit layer of the hierarchy will have sixty-four cortical processing units.

Patch 310 illustrates an example four by four patch of pixels taken from the full thirty-two by thirty-two grid of pixels. Each patch of pixels can be addressed using the row and column numbers illustrated on grid of FIG. 3B. A full address should also include an identifier of the layer of the cortical processing unit hierarchy layer. In this example, the lowest hierarchical layer will be deemed layer "X". Thus, the address for the example patch could be given as X17 wherein the first character specifies the cortical unit layer, the second character specifies the row, and the third character specifies the column.

The Cortical Processing Unit Hierarchy

Figure 3C:
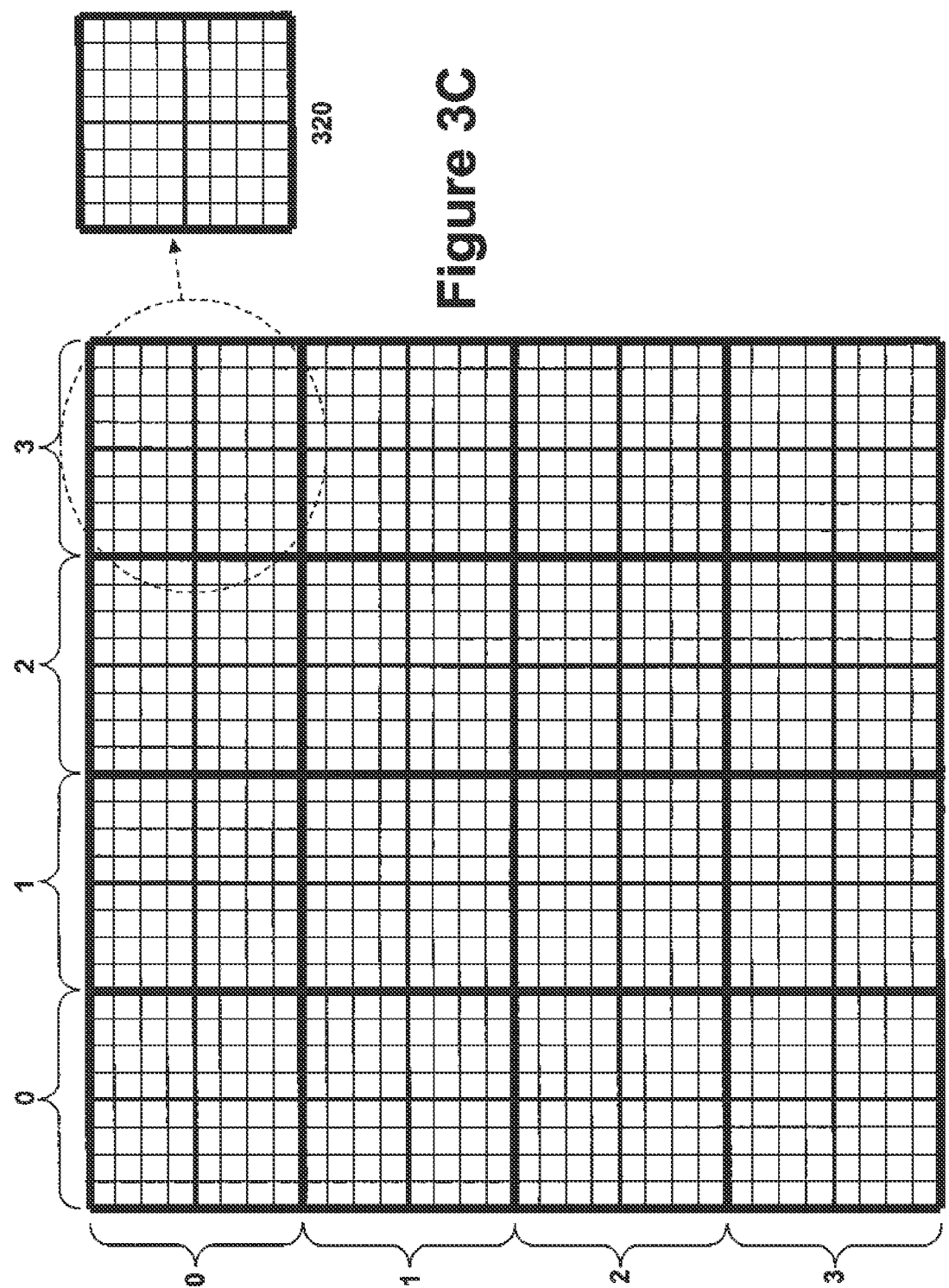
FIG. 3C illustrates the pixel grid of FIG. 3B wherein the sixty-four pixel patches have been grouped together in groups of four to form sixteen meta-patches that are examined by the sixteen processing units of the second processing unit layer.

In the next higher cortical unit layer, each cortical processing unit was assigned to examine the sequence of patterns created by four adjacent cortical processing units. Specifically, FIG. 3C illustrates sixteen groups of four by four pixel patches on the grid that are examined by the sixteen cortical processing units of the second cortical layer. As with the lower layer X, the sixteen patches of FIG. 3C (and their respective cortical processing units) can be addressed using a row and column index. Thus, if the second layer is designated as layer Y then the corner patch 320 can be addressed as Y03 wherein Y is the layer, 0 is the row, and 3 is the column.

Figure 4:
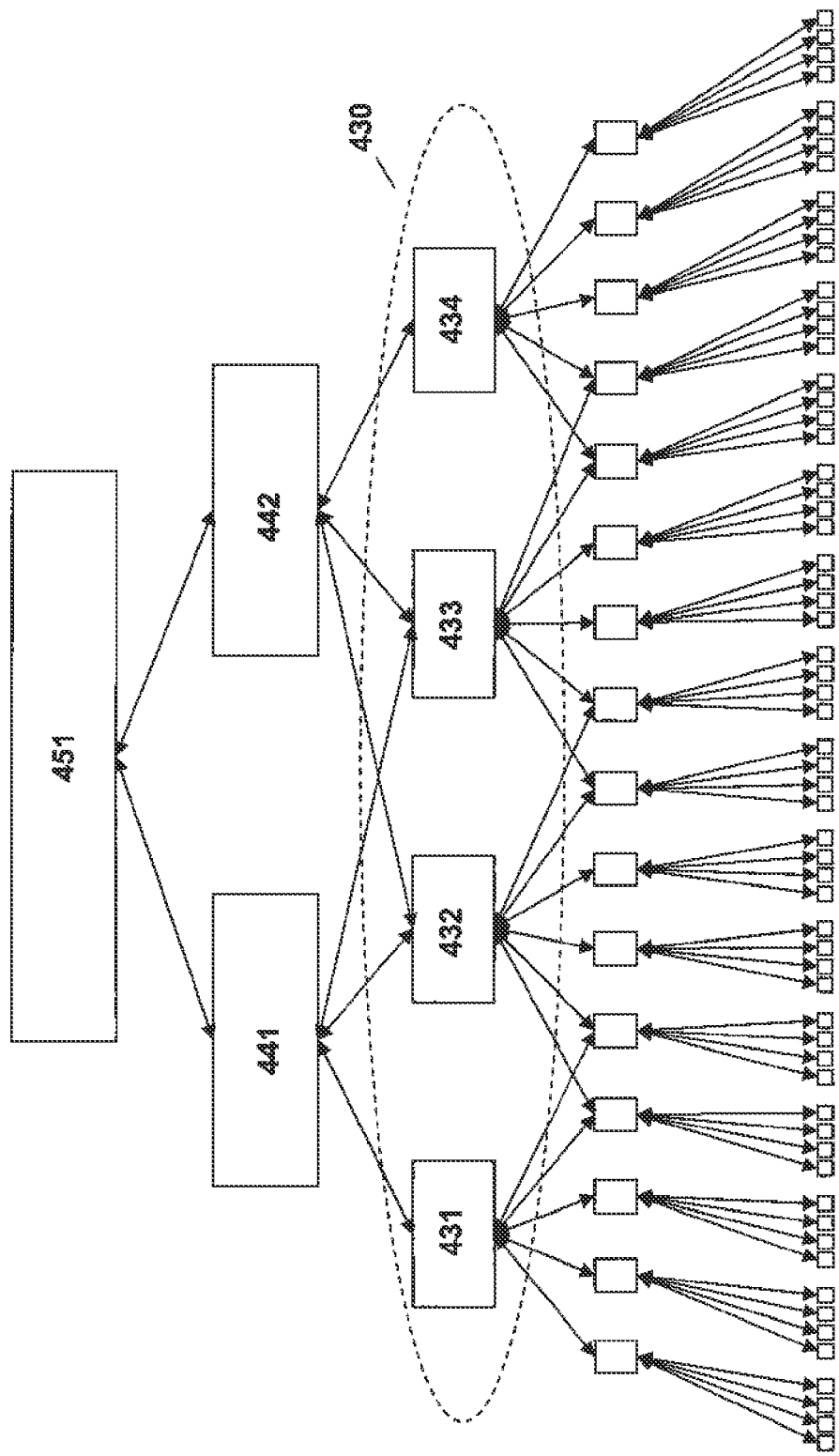
FIG. 4 illustrates one possible example of the hierarchy of the cortical processing units for the thirty-two by thirty-two grid of pixels illustrated in FIGS. 3A to 3C.

Successive cortical processing unit layers would be implemented in a similar manner. FIG. 4 illustrates one possible example of the hierarchy of the cortical processing units for the thirty-two by thirty-two grid of pixels illustrated in FIGS. 3A to 3C. In the example of hierarchy of FIG. 4, a third layer has four cortical processing units wherein each processing unit handles data from four cortical processing units in the second layer. A fourth cortical processing unit layer consists of two cortical processing units wherein each considers the outputs from two cortical processing units in the third layer. Finally, fifth and top cortical processing unit layer processes the output from the two cortical processing units of the fourth layer.

Note that the cortical processing units in the successively higher layers of the hierarchy in FIG. 4 process information from more than one cortical processing unit in the layer below. Thus, the receptive field of successively higher cortical processing units grows larger as one ascends the hierarchy of cortical processing units. This is designed to be similar to the visual system of the human neocortex that operates in a similar manner.

Note that FIG. 4 presents only one arbitrary selected hierarchical arrangement for the pattern recognition problem. Many other hierarchical arrangements could be created. For example, the processing units in the lowest layer of the hierarchy of FIG. 4 each consider an input consisting of sixteen pixels in a four by four pixel patch. But many other divisions of sensory input could be used such as having the cortical units on the lowest layer only consider input from four pixels in two by two pixel patches. The same principle applies to all of the different cortical processing unit layers in the hierarchy. For example, the cortical processing units on the third layer 430 could consider the output from five or six cortical processing units in the second layer. In another embodiment, the cortical processing units on the third layer 430 may each only consider the output from four processing units in the lower second layer.

In the prototype program, a smaller cortical processing unit hierarchy was constructed. FIG. 5A illustrates the cortical hierarchy architecture used to construct the prototype program. As illustrated in FIG. 5A, the lowest cortical processing unit layer, the X layer 510, has sixty-four cortical processing units for processing the sensory input from the thirty-two by thirty-two pixel grid in individual four by four pixel patches as set forth with FIG. 3B. The second cortical processing unit layer, the Y layer 520, has sixteen cortical processing units wherein each cortical processing unit processes the output from four cortical processing units in the X layer 510 as set forth with FIG. 3C. Finally, in the prototype program hierarchy of FIG. 5A, a single cortical processing unit comprised the top layer, named the Z layer 530. The single processing unit on the Z layer 530 processes the output from all sixteen cortical processing units on the Y layer 520.

Figure 6:
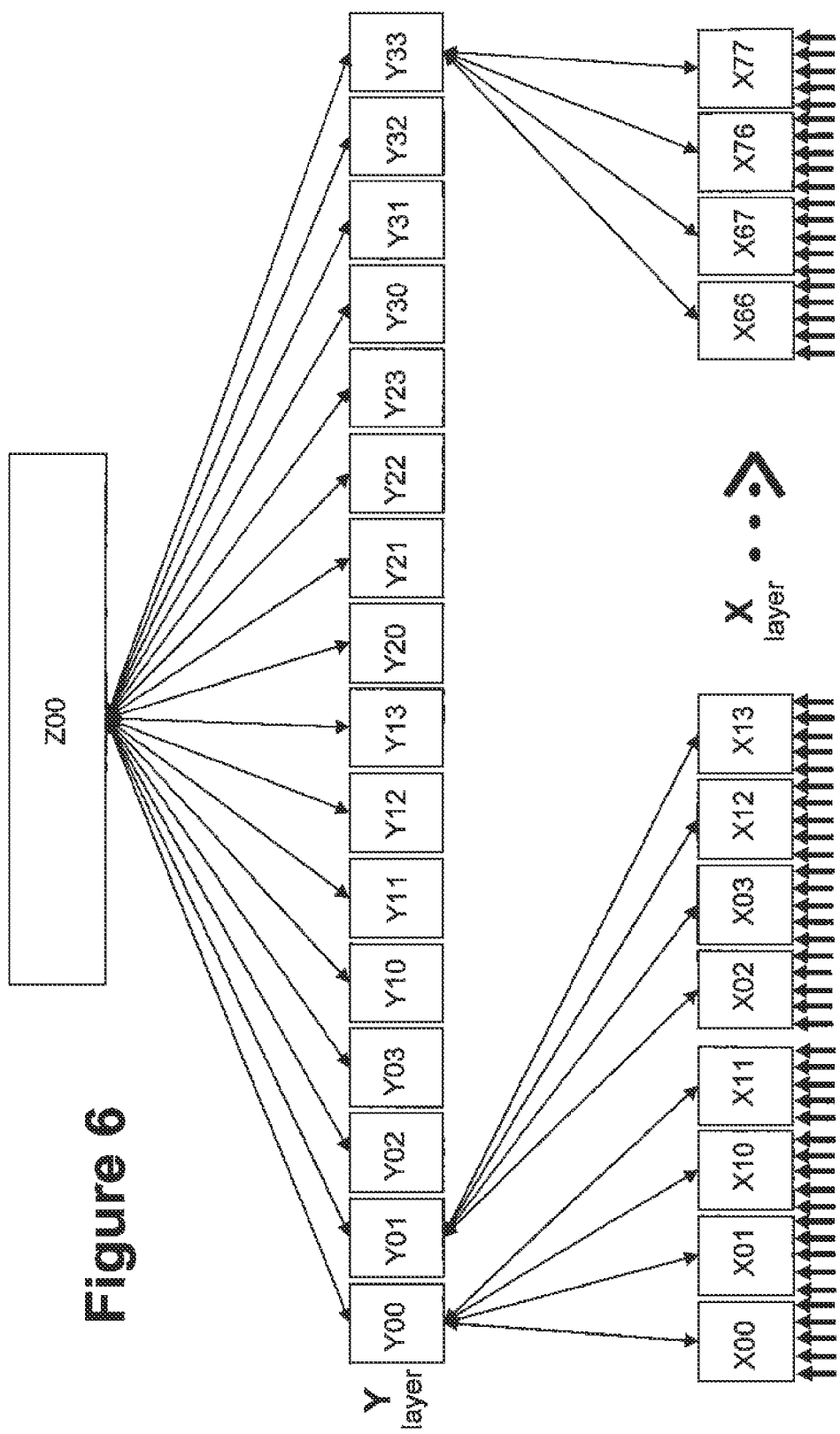
FIG. 6 illustrates an alternate view of the cortical processing unit hierarchy of FIG. 5A wherein the cortical processing units are each labeled with the addressing system set forth with reference to FIGS. 3B and 3C.

FIG. 6 illustrates an alternate view of the cortical processing unit hierarchy of FIG. 5A. In the alternate view of FIG. 6, each of the cortical processing units is labeled with an address using the addressing system set forth with reference to FIGS. 3B and 3C.

The Visual Patterns for Training

Figure 8:
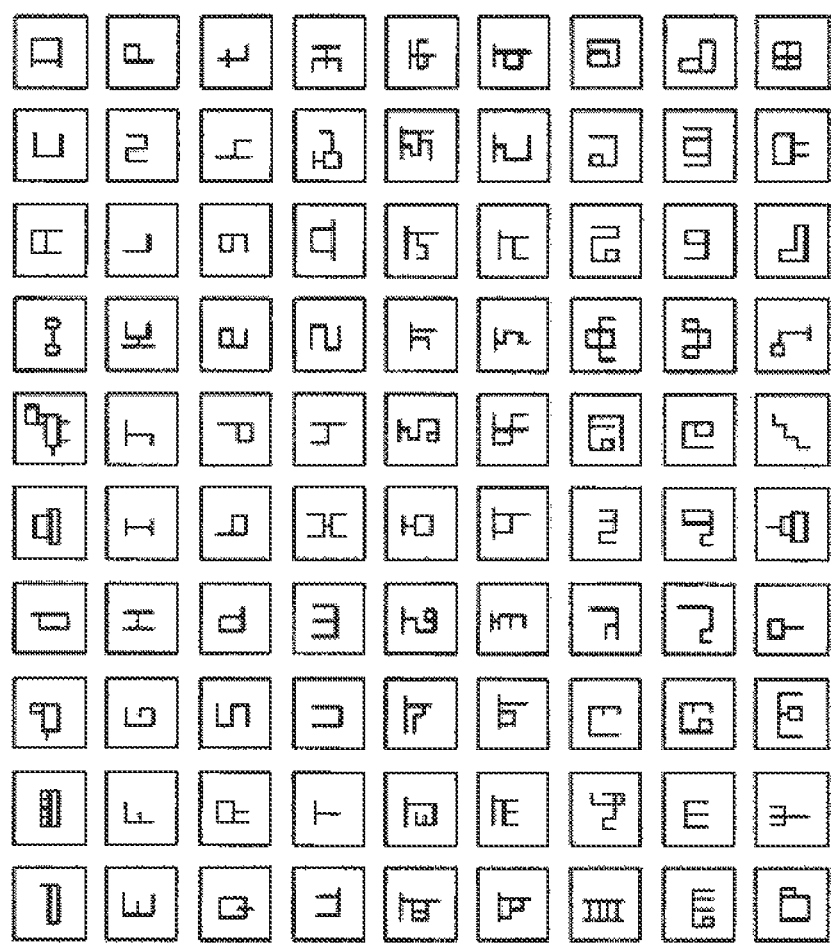
FIG. 8 illustrates ninety training shapes that were used to train the prototype program.

To train the prototype program, a set of line drawing shapes were presented to the prototype program. FIG. 8 illustrates an example set of ninety training shapes that were used to train the prototype program. The line drawing shapes of FIG. 8 were presented to the prototype program in the form of animated movies that had the line drawing training shape moving about in the thirty-two by thirty-two pixel world. This training allows the prototype program to learn about various geometric shapes in FIG. 8 that make up the world of the prototype program and the movements of those geometric shapes in its limited visual world.

Unsupervised Training

During initial training, the cortical processing units of the prototype program each memorize the most frequently occurring sequences of patterns that are encountered. For example, the cortical processing units in the lowest X layer 510 of the prototype program memorizes the most frequently occurring sequences of patterns that are encountered on their local four by four pixel patch. In one embodiment of the prototype program, the cortical processing units in the lowest X layer 510 memorize sequences of four consecutive patterns. Similar pattern sequence learning also occurs at the Y layer and the Z layer. This unsupervised learning allows the prototype program to learn the various primitive structures that make up its world.

The unsupervised training was initially performed with animated movies of the specific objects that were to later be recognized. For example, the unsupervised training may have used the letter line drawings in FIG. 8. However, another unsupervised training session used a set of shapes that did not include any of the shapes that the system would later attempt to recognize. It was discovered that as long as the line drawings used in training included the same low-level primitive structures that exist in the line drawings to be recognized (such as the letters) then this unsupervised training without the letters worked fine. The low-level primitive structures in the letters include structures such as vertical lines, horizontal lines, corners, boxes, and parallel lines. Thus, it was immediately apparent that the hierarchical arrangement learned about low level primitive structures that consistently existed in its world. The prototype program then combined the low-level structures in various manners to create representations of many different higher level objects.

Figure 9:
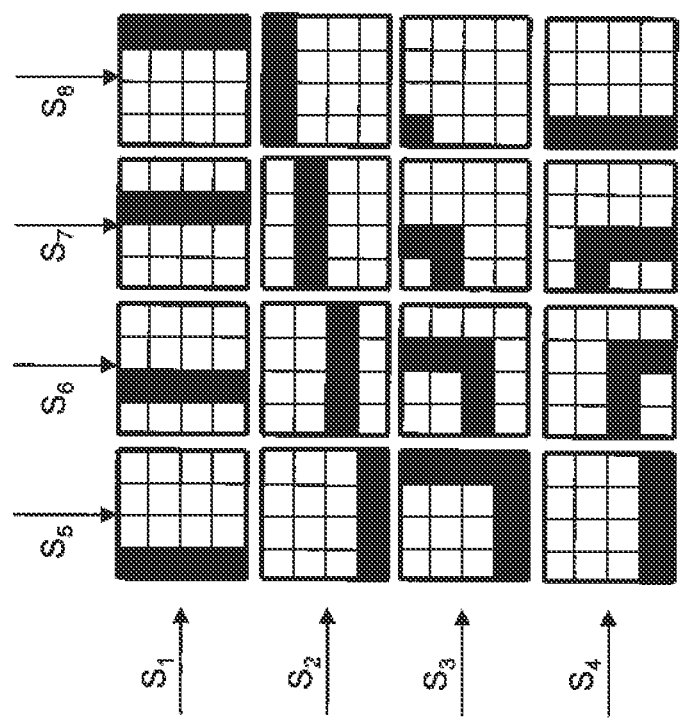
FIG. 9 illustrates eight different possible sequences of four consecutive patterns.

FIG. 9 illustrates eight different possible sequences of four consecutive four by four pixel patterns that could be seen by the cortical processing units of the lowest layer of the cortical processing unit hierarchy (X layer 510). The four horizontal sequences of patterns $S_1$, $S_2$, $S_3$, and $S_4$ represent four pattern sequences commonly encountered during the animated movies of the unsupervised training $S_1$ and $S_2$ depict a vertical line moving right and a horizontal line moving upward, respectively. $S_3$ and $S_4$ depict the motion of a lower left corner and an upper-right corner, respectively. The four vertical sequences of patterns $S_5$, $S_6$, $S_7$, and $S_8$ depict very random pattern sequences that never (or almost never) occur. Thus, frequently occurring (repeated) sequences of patterns such as those of $S_1$, $S_2$, $S_3$, and $S_4$ and other frequently occurring sequences were memorized by the lowest X layer 510 cortical processing units as sequences that contain invariant structure.

In one embodiment, only the thirteen most frequently occurring sequences of patterns were stored in the memory of cortical processing units in the X layer 510. Each of the memorized frequently occurring sequence of patterns is given a unique identifier. In one embodiment, each of the different memorized sequences were very different such that the X layer 510 cortical processing units could immediately recognize which memorized sequence was being experienced. (The sequences had no or almost no shared patterns.)

The identifiers of recognized sequences of patterns are passed up to the next layer of cortical processing units, the Y layer 520 of FIG. 5A. As illustrated in the particular hierarchical arrangement of FIG. 5A, each cortical processing unit in the Y layer 520 receives information from four cortical processing units in the lower X layer 510. The four sequence identifiers from the four X layer units are combined to form a spatial pattern received by the cortical processing unit in the Y layer 520. In one embodiment, the sequence identifiers from the four X layer processing units are simply concatenated together to form a unique pattern that is presented to the cortical processing unit in the Y layer 520. Note that the Y layer cortical processing units understand higher level concepts since Y layer processing units combine together sequence information from four individual X layer processing units.

As previously set forth, one embodiment memorized thirteen different commonly encountered sequences in the X layer 520. With sequence identifier information from four different X layer cortical processing units wherein each layer may be in one of thirteen different sequences; the Y layer 520 processing units may experience $13^4=28561$ possible different input patterns. However, only seven hundred and forty-four (744) different input patterns were actually experienced. Thus, as predicted, only a small percentage of the possible input patterns into a cortical processing are ever experienced by the cortical processing unit.

The cortical processing units in the Y layer 520 may perform the same learning operation as the cortical processing units in the X layer 510 as set forth above. Specifically, each cortical processing unit in the Y layer 520 identifies and then memorizes commonly experienced sequences of patterns on its input stream. The Y layer processing units would later attempt to recognize those memorized sequences in their input streams. The Y layer processing units could then report recognized sequences of patterns to the next higher cortical processing unit layer, the Z layer 530. The Z layer 530 receives sequence identifiers from all sixteen different processing units in the Y layer 520. The sixteen sequence identifiers from the Y layer may be combined to form a spatial pattern received by the Z layer 530.

In one particular embodiment, the prototype program also collects a set of statistics about the patterns and pattern sequences that are detected during the unsupervised learning phase. The collected statistics may include how many times a particular pattern or sequence is encountered and how many times a particular input value is encountered. As set forth in the in the earlier section on making specific predictions from invariant representations, one very important statistic to keep track of is the specific context when a particular pattern or sequence encountered. In one embodiment, the particular higher-layer pattern may be the context for the lower layer patterns and sequences. It is during this training phase that the system constructs a Bayes network such that Bayesian inference using Bayesian belief propagation may be used to perform pattern recognition. Details on Bayesian inference will be set forth in greater detail in a later section.

Supervised Training

After the unsupervised training, the prototype program has collected sequences of patterns and developed higher level object concepts from the lower layer sequences. Since the prototype program already understands object concepts at the top level, the training from layer Y to layer Z can proceed in a supervised manner. The supervised training links specific object names to object concepts that have been learned at the high Z layer. In this manner, the prototype program may later infer the specific object names when giving novel input data.

The supervised training may be performed by presenting an object name to the top Z layer 530 while presenting an animated movie of the particular object shape. The prototype program thus links the high level concept at the Z layer (the current sequence with the object name currently being presented.

For example, during supervised training with the third geometric shape from the left on the top row of FIG. 8, the memorized sequences recognized at the Z layer are associated with the name "cat". Similarly, during training with the sixth geometric shape from the left on the top row, the memorized sequences recognized at the Z layer are associated with the name "dog". And so on with all the different geometric shapes during training.

As with the unsupervised training phase, the prototype program also collects a set of statistics about the detected patterns and pattern sequences during the supervised learning phase. These statistics will be used to build probability tables in order to perform Bayesian inference as will be described in a later section.

Pattern Recognition Using Bayesian Inference

The learning pattern recognition prototype program uses Bayesian inference techniques in order to generate very accurate object name using pattern recognition. In the prototype program, the objective is to have recognized sequence information at the top Z layer 530 associated with the correct object name. Ideally, even novel input patterns should output recognized Z layer sequences (and the object name associated with the recognized Z layer sequence) due to generalization of the knowledge acquired by the prototype program.

Bayes' rule allows for a system to determine the probability of a particular result R outcome based upon available evidence E. To compute this probability, one needs to have observed a fair amount of information about the different possible results R and the different possible evidence E. The fundamental rule of Bayesian learning is that $$P(R|E)=P(E|R)P(R)/P(E)$$

This states that the probability of a particular result R when given certain evidence E is equal to the probability that the particular evidence E given the result R times the prior probability of encountering the result R divided by the probability of encountering the evidence E.

To perform the desired pattern recognition with the prototype program, the prototype program must attempt to determine the output sequence Z at the top of the hierarchy (and thus the associated object name) when given particular input information at the bottom (X layer 510) of the hierarchy. Since this is a bottom to top determination, it is technically referred to as an inference. The input information is supplied in the form of a static thirty-two by thirty-two pixel drawing that is provided into the lowest layer, the X layer 510. The lowest X layer 510 processes the thirty-two by thirty-two pixel drawing to determine the mostly likely sequence at the X layer. If given time, the X layer could also receive and consider real pattern sequence information to generate more accurate results.

To make the desired determination of the Z sequence, it would be desirable to know the probability of different possible output $Z_j$ sequences when given the specific input sequence $X_i$. This probability is expressed as P(Z|X). Using Bayes' rule, we know that:

$$P(Z_j|X_i)=P(X_i|Z_j)/P(X_i)$$

Therefore, to determine the probability of a particular Z sequence when given the input information of X, the prototype program must know:

$P(X_i|Z_j)$ which is the probability that the specific $X_i$ input is causing sequence $Z_j$ $P(Z_j)$ which is the probability encountering of the particular $Z_j$ sequence; and $P(X_i)$ which is the probability of encountering the specific input sequence $X_i$ The information to determine all three of these needed probability values was collected during the learning phase.

Figure 7:
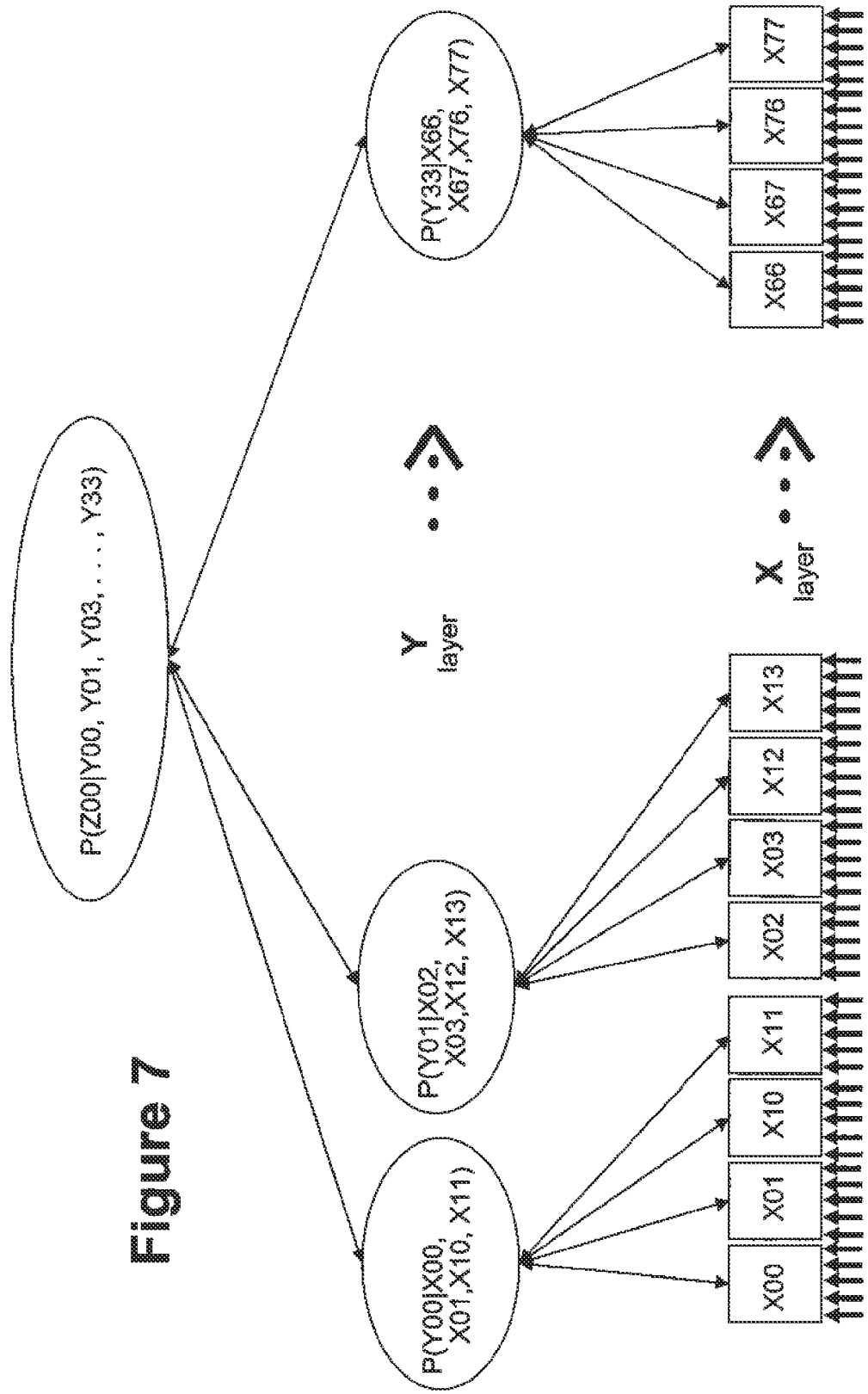
FIG. 7 illustrates a Bayes belief net for the cortical processing unit hierarchy of FIG. 5A.

It should be noted that the probability of a specific X sequence input value given a particular Z sequence, P(X|Z), is not directly learned and placed into a probability table. Instead, the problem is broken down into a Bayes belief net. Thus, different probability tables are created during learning such that those probability tables can then be combined with a Bayes rule network to obtain the desired probability value. FIG. 7 illustrates the Bayes belief net for the pattern recognition system of the prototype program.

As illustrated in the Bayes belief network of FIG. 7, a Y sequence value can be selected using a probability of the Y sequence value given specific X sequence inputs [P(Y|X)]. Subsequently, the Z sequence value can be selected using a probability of the Z value given selected Y sequence inputs [P(Z|Y)]. These probabilities may be computed using Bayes' rule. In order to perform this, all of the individual Y layer processing units can observe the probability of a particular Y sequence value given a specific Z sequence value, P(Y|Z). Similarly, all of the individual X layer processing units can observe the probability of a particular X sequence value given the specific Y sequence value, P(X|Y).

To store the needed probability values, one must have contextual feedback that is presented from higher cortical layers to lower cortical layers during training FIG. 5B illustrates examples of the contextual feedback that may be presented from higher cortical layers to lower cortical layers in order to allow the needed probability tables to be created. For each cortical processing unit in the Y layer, the current Z sequence context information is provided. This is illustrated in FIG. 5B as the current Z sequence value being fed back to Y layer processing units. (Note that the context feed back is only illustrated for the two left-most Y layer processing units but the current Z sequence is provided to all of the sixteen Y layer processing units.) This Z sequence contextual feedback allows each cortical processing unit in the Y layer to create a probability table that specifies the probabilities of all the different Y sequences when given a specific Z sequence, P(Y|Z). The sixteen probability tables in the sixteen processing units in the Y layer may appear as follows:

$$\begin{array}{c} \\ z_1 \\ z_2 \\ z_3 \\ \cdots \\ z_n \end{array} \begin{bmatrix} y_1 & y_2 & y_3 & \cdots & y_m \\ P(y_1|z_1) & P(y_2|z_1) & P(y_3|z_1) & \cdots & P(y_m|z_1) \\ P(y_1|z_2) & P(y_2|z_2) & P(y_3|z_2) & \cdots & P(y_m|z_2) \\ P(y_1|z_3) & P(y_2|z_3) & P(y_3|z_3) & \cdots & P(y_m|z_3) \\ \cdots & \cdots & \cdots & \cdots & \cdots \\ P(y_1|z_n) & P(y_2|z_n) & P(y_3|z_n) & \cdots & P(y_m|z_n) \end{bmatrix}$$

The same type of feedback is provided to the next lower layers as well. Specifically, for each cortical processing unit in the X layer, the current Y sequence context information is provided from its associated Y layer processing unit. This is illustrated in FIG. 5B as the current Y sequence value from Y layer processing units Y00 being fed back to two associated lower X layer processing units. (Note that only two feed back paths are illustrated from a Y layer processing unit to two X layer processing units. However all sixteen of the individual Y layer processing units would feedback their current Y sequence to their four associated X layer units.) This Y sequence contextual feedback allows each cortical processing unit in the X layer to create a probability table that specifies the probabilities of all the different X sequences when given a specific Y sequence, P(X|Z). These sixty-four probability tables in the various X layer processing units may appear as follows:

$$\begin{array}{c} & x_1 & x_2 & x_3 & \ldots & x_m \\ y_1 \\ y_2 \\ y_3 \\ \ldots \\ y_n \end{array} \begin{bmatrix} P(x_1 \mid y_1) & P(x_2 \mid y_1) & P(x_3 \mid y_1) & \ldots & P(x_m \mid y_1) \\ P(x_1 \mid y_2) & P(x_2 \mid y_2) & P(x_3 \mid y_2) & \ldots & P(x_m \mid y_2) \\ P(x_1 \mid y_3) & P(x_2 \mid y_3) & P(x_3 \mid y_3) & \ldots & P(x_m \mid y_3) \\ \ldots & \ldots & \ldots & \ldots & \ldots \\ P(x_1 \mid y_n) & P(x_2 \mid y_n) & P(x_3 \mid y_n) & \ldots & P(x_m \mid y_n) \end{bmatrix}$$

Overall Operation of the Prototype Program

The prototype program is first trained during a training phase using shapes such as the shapes illustrated in FIG. 8. During this training period, each of the cortical processing units will extract structure observed in its world in the form of commonly repeated sequences of patterns. Such training may take place unsupervised. Furthermore, such training doesn't even require the specific objects that will later need to be recognized. The training may be occur with any shapes that have the same types of primitive structures that exist in the objects to be recognized. During the unsupervised training, each of the cortical processing units in the prototype program creates memories of the invariant structures that it detects during its exploration of its world.

Later, supervised training is performed. During the supervised training, an object name associated with a particular object is presented to the prototype program in addition to an animated movie of the object that is being using for training During such supervised training, the prototype program learns to associate the object name with the sequences on the Z layer.

In an operation phase, novel data with an object image is presented to the prototype program. When the novel object data is presented, the prototype program extracts the structure from the object image in the form of stored structure recognized in the X, Y, and Z layers. The recognized structure is used to identify associated sets of probability tables. The identified probability tables are then used to calculate the probabilities of each object name being the correct name of the viewed object. Finally, the object name with the highest probability is inferred to be the name of the object in the novel image.

Figure 10:
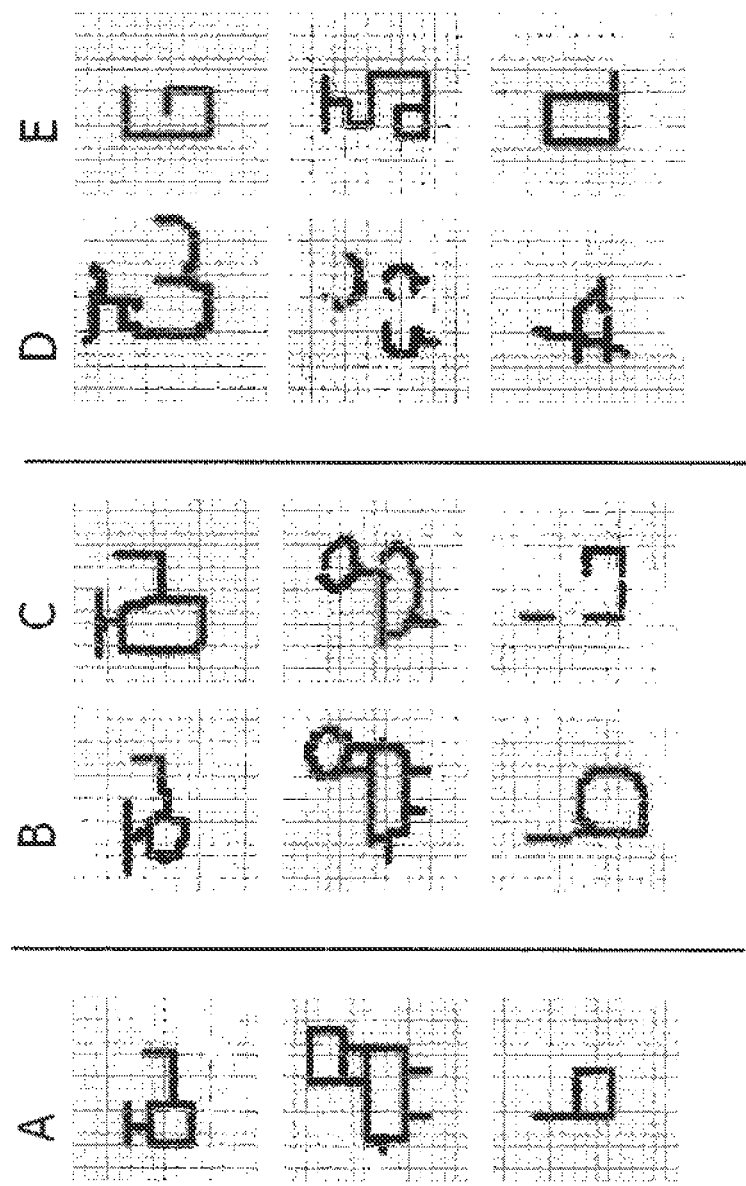
FIG. 10 illustrates some result data from three different line drawing tests using a prototype program.

The prototype pattern recognition program has provided highly accurate results. Furthermore, the prototype program has exhibited a strong ability to generalize. FIG. 10 illustrates some result data from three different line drawing tests. Column A presents the original training line drawing. Columns B and C illustrate human made line drawings that were successfully identified as belonging to the same class as the object in the Column A. Columns B and C illustrate human made line drawings that were successfully identified as belonging to the same class as the object in the Column A. Column D contains human made line drawings that were not successfully identified as belonging to the same class as the object in the Column A. Column E contains the line drawing class that program believed the line drawing of column D belonged within.

The foregoing has described methods, architecture, and apparatus for implementing machine intelligence are disclosed. It is contemplated that changes and modifications may be made by one of ordinary skill in the art, to the materials and arrangements of elements of the present invention without departing from the scope of the invention.

What is claimed is:

1. A computer system comprising:
 a processor; and
 a memory coupled to the processor, the memory comprising:
  a first lower level processing unit configured to receive a first portion of an input data at a first time and generate a first output representing information about temporal sequences of spatial patterns in the first portion of the input data corresponding to first learned temporal sequences of spatial patterns;
  a second lower level processing unit configured to receive a second portion of the input data at the first time and generate a second output representing information about temporal sequences of spatial patterns in the second portion of the input data corresponding to second learned temporal sequences of spatial patterns; and
  an upper level processing unit associated with the first and second lower level processing units, the upper level processing unit configured to generate a third output based on the first and the second outputs, the third output sent to at least one of the first and second lower level processing unit as a first prediction of spatial patterns in the first portion of the input data to be received by the first lower level processing unit or the second portion of the input data to be received by the second lower level processing node at a second time subsequent to the first time.

2. The computer system of claim 1, further comprising one or more sensory units configured to provide the input data to the first lower level processing unit and the second lower level processing unit.

3. The computer system of claim 1, wherein the first lower level processing unit, the second lower level processing unit, and the upper level processing unit each comprises a probability table for generating the first output, the second output or the third output.

4. The computer system of claim 1, wherein the first lower level processing unit, the second lower level processing unit, and the upper level processing unit form a Bayesian belief net.

5. The computer system of claim 1, wherein the first lower level processing unit is configured to generate a second prediction output based on the first portion of the input data received at a first time, the second prediction output representing predicted input data to be received at the second time, the second prediction output fed back to the first lower level processing unit at the second time to generate the first output at a third time subsequent to the second time.

6. The computer system of claim 5, wherein the prediction output resolves ambiguities in the first portion of the input data received at the first lower level processing unit.

7. The computer system of claim 1, wherein the first learned temporal sequences are temporal sequences in a training input data detected more frequently by the first lower level processing unit than other temporal sequences in the training input data and the second learned temporal sequences are temporal sequences in the training input detected more frequently by the second lower level processing unit than other temporal sequences in the training input data.

8. The computer system of claim 7, wherein the training input data comprises animated movies.

9. The computer system of claim 1, wherein the upper level processing unit is configured to learn temporal sequences in a concatenation of the first output and the second output.

10. The computer system of claim 1, wherein the upper level processing unit determines whether sequences of combinations of the first output and the second output correspond to third learned sequences of patterns, the first and second learned sequences of patterns representing a first level of structures in the input data, and the third learned sequences of patterns representing a second level of structures in the input data that are formed by the first level of structures.

11. The computer system of claim 10, wherein the first level of structures comprise vertical lines, horizontal lines, corners, boxes, and parallel lines; and the second level of structures comprise letters.

12. The computer system of claim 1, wherein the first learned temporal sequences are temporal sequences in a training input data detected more frequently by the first lower level processing unit than other temporal sequences in the training input data and the second learned temporal sequences are temporal sequences in the training input detected more frequently by the second lower level processing unit than other temporal sequences in the training input data.

13. A computer-implemented method comprising:
at a first lower level processing unit, generating a first output representing information about temporal sequences of spatial patterns in a first portion of an input data received at a first time corresponding to first learned temporal sequences of spatial patterns;
at a second lower level processing unit, generating a second output representing information about temporal sequences of spatial patterns in a second portion of the input data received at the first time corresponding to second learned temporal sequences of spatial patterns;
at an upper level processing unit, generating a third output based on the first and the second outputs, the third output representing information about causes to the input data; and
sending the third output to at least one of the first and second lower level processing unit as a first prediction of spatial patterns in the first portion of the input data to be received by the first lower level processing unit or the second portion of the input data to be received by the second lower level processing node at a second time subsequent to the first time.

14. The method of claim 13, wherein the input data to the first lower level processing unit and the second lower level processing unit is generated by one or more sensor units.

15. The method of claim 13, wherein the first lower level processing unit, the second lower level processing unit, and the upper level processing unit form a Bayesian belief net.

16. The method of claim 13, further comprising:
generating a second prediction output at the first lower level processing unit based on the first portion of the input data received at the first time, the prediction output representing predicted input data to be received at the second time; and
feeding the second prediction output back to the first lower level processing unit at the second time to generate the first output at a third time subsequent to the second time.

17. The method of claim 16, further comprising resolving ambiguities in the first portion of the input data received at the first lower level processing unit using the prediction output.

18. A non-transitory computer-readable storage medium storing instructions thereon, the instructions when executed by a processor cause the processor to:
generate, at a first lower level processing unit, a first output representing information about temporal sequences of spatial patterns in a first portion of an input data received at a first time corresponding to first learned temporal sequences of spatial patterns;
generate, at a second lower level processing unit, a second output representing information about temporal sequences of spatial patterns in a second portion of the input data received at the first time corresponding to second learned temporal sequences of spatial patterns;
generate, at an upper level processing unit, a third output based on the first and the second outputs, the third output representing information about causes to the input data; and
send the third output to at least one of the first and second lower level processing unit as a first prediction of spatial patterns in the first portion of the input data to be received by the first lower level processing unit or the second portion of the input data to be received by the second lower level processing node at a second time subsequent to the first time.

* * * * *